(12) United States Patent
Muley et al.

(10) Patent No.: US 10,277,638 B2
(45) Date of Patent: Apr. 30, 2019

(54) PROVIDING BONDED SERVICES AT A NON-ANCHOR NODE

(71) Applicants: Praveen Vasant Muley, Cupertino, CA (US); Laurent Thiebaut, Antony (FR); Wim Henderickx, Westerlo (BE); Thierry Van De Velde, Antwerp (BE); Vachaspathi P. Kompella, Cupertino, CA (US)

(72) Inventors: Praveen Vasant Muley, Cupertino, CA (US); Laurent Thiebaut, Antony (FR); Wim Henderickx, Westerlo (BE); Thierry Van De Velde, Antwerp (BE); Vachaspathi P. Kompella, Cupertino, CA (US)

(73) Assignees: Nokia of America Corporation, Murray Hill, NJ (US); Alcatel Lucent, Nozay (FR)

( * ) Notice: Subject to any disclaimer, the term of this patent is extended or adjusted under 35 U.S.C. 154(b) by 323 days.

(21) Appl. No.: 15/047,855

(22) Filed: Feb. 19, 2016

(65) Prior Publication Data
US 2016/0308918 A1 Oct. 20, 2016

Related U.S. Application Data

(60) Provisional application No. 62/147,516, filed on Apr. 14, 2015.

(51) Int. Cl.
*G06F 15/16* (2006.01)
*H04L 29/06* (2006.01)
(Continued)

(52) U.S. Cl.
CPC ...... *H04L 65/1069* (2013.01); *H04L 12/2863* (2013.01); *H04L 12/66* (2013.01);
(Continued)

(58) Field of Classification Search
CPC . H04L 65/1069; H04L 12/66; H04L 12/2863; H04L 43/0876; H04L 43/062;
(Continued)

(56) References Cited

U.S. PATENT DOCUMENTS

| 2014/0341109 A1 | 11/2014 | Cartmell et al. |
| 2014/0355536 A1 | 12/2014 | Muley |

(Continued)

OTHER PUBLICATIONS

International Search Report and Written Opinion of corresponding PCT/US2016/027358, dated Jun. 29, 2016, total pp. 11.

*Primary Examiner* — Richard G Keehn
(74) *Attorney, Agent, or Firm* — Tong, Rea, Bentley & Kim, LLC

(57) ABSTRACT

The disclosure relates generally to supporting bonded services at non-anchor nodes. A non-anchor gateway device is configured to support service bonding for a user device and communication with an anchor node of the user device. The non-anchor gateway device is configured to associated a set of user device data plane connections of the user device to form a bonded session for the user device where the set of user device data plane sessions includes a first user device data plane connection associated with a first access network and a second user device data plane connection associated with a second access network. The non-anchor gateway device is configured to map user device traffic of the user device between the user device data plane connections of the bonded session and a user device data plane session between the gateway device and the anchor node for the user device.

21 Claims, 14 Drawing Sheets

(51) Int. Cl.
    *H04L 12/26*  (2006.01)
    *H04L 12/28*  (2006.01)
    *H04L 12/66*  (2006.01)
    *H04L 29/12*  (2006.01)

(52) U.S. Cl.
    CPC ........ *H04L 43/062* (2013.01); *H04L 43/0876* (2013.01); *H04L 61/2007* (2013.01); *H04L 61/2514* (2013.01); *H04L 61/6077* (2013.01)

(58) Field of Classification Search
    CPC ............. H04L 61/2514; H04L 61/6077; H04L 61/2007
    See application file for complete search history.

(56) References Cited

U.S. PATENT DOCUMENTS

2016/0119157 A1* 4/2016 Hua .................... H04L 65/1069
                                                        370/312
2016/0301724 A1* 10/2016 Kodaypak ........... H04L 65/1069

* cited by examiner

PROVIDING BONDED SERVICES AT A NON-ANCHOR NODE

CROSS REFERENCE TO RELATED APPLICATION

This application claims the benefit of U.S. Provisional Patent Application Ser. No. 62/147,516, filed on Apr. 14, 2015, entitled "SYSTEM AND METHOD PROVIDING MAXIMUM FILL LINK VIA BONDED SERVICES WITH AND WITHOUT A BOOST GATEWAY," which is hereby incorporated herein by reference in its entirety.

TECHNICAL FIELD

The disclosure relates generally to communication networks and, more specifically but not exclusively, to use of bonded services in communication networks.

BACKGROUND

Various types of devices may be capable of communicating via multiple access technologies. For example, various types of end user devices (e.g., smartphones, tablet computers, or the like) are typically capable of communicating via multiple access technologies, such as via various cellular wireless access networks (e.g., Third Generation (3G), Long Term Evolution (LTE), or the like) as well as via various local wireless access networks (e.g., WiFi networks such as 802.11x networks or the like). Similarly, for example, various types of Customer Premises Equipment (CPE) (e.g., Residential Gateways (RGs), set-top boxes (STBs), routers, switches, or other types of residential/enterprise gateway devices) may be capable of communicating via multiple access technologies, such as via wireless access technologies (e.g., cellular wireless access technologies such as 3G or LTE, local wireless access technologies such as Wi-Fi, or the like) as well as via various wireline access technologies (e.g., Digital Subscriber Line (DSL) access, cable access, optical network access, or the like).

SUMMARY

Various embodiments support a bonded service at a non-anchor node of a communication network.

In at least some embodiments, an apparatus includes a processor and a memory communicatively connected to the processor, wherein the processor is configured to associate, at a gateway device, a set of user device data plane connections of a user device to form a bonded session for the user device wherein the set of user device data plane sessions includes a first user device data plane connection associated with a first access network and a second user device data plane connection associated with a second access network and map user device traffic of the user device between the user device data plane connections of the bonded session and a user device data plane session between the gateway device and an anchor node for the user device.

In at least some embodiments, a non-transitory computer-readable storage medium stores instructions which, when executed by a processor, cause the processor to perform a method, the method including associating, at a gateway device, a set of user device data plane connections of a user device to form a bonded session for the user device wherein the set of user device data plane sessions includes a first user device data plane connection associated with a first access network and a second user device data plane connection associated with a second access network and mapping user device traffic of the user device between the user device data plane connections of the bonded session and a user device data plane session between the gateway device and an anchor node for the user device.

In at least some embodiments, a method includes associating, at a gateway device comprising a processor and a memory, a set of user device data plane connections of a user device to form a bonded session for the user device wherein the set of user device data plane sessions including a first user device data plane connection associated with a first access network and a second user device data plane connection associated with a second access network and mapping user device traffic of the user device between the user device data plane connections of the bonded session and a user device data plane session between the gateway device and an anchor node for the user device.

In at least some embodiments, an apparatus includes a processor and a memory communicatively connected to the processor, wherein the processor is configured to associate, at a gateway device, a set of user device data plane connections of a user device to form a bonded session for the user device wherein the set of user device data plane sessions includes a first user device data plane connection associated with a first access network and a second user device data plane connection associated with a second access network and wherein the first user device data plane connection is supported by a data plane connection between the gateway device and an anchor node for the user device, receive, at the gateway device, user device traffic intended for the user device, and allocate, at the gateway device, the user device traffic to the user device data plane connections of the bonded session for the user device.

In at least some embodiments, a non-transitory computer-readable storage medium stores instructions which, when executed by a processor, cause the processor to perform a method, the method including associating, at a gateway device, a set of user device data plane connections of a user device to form a bonded session for the user device wherein the set of user device data plane sessions includes a first user device data plane connection associated with a first access network and a second user device data plane connection associated with a second access network and wherein the first user device data plane connection is supported by a data plane connection between the gateway device and an anchor node for the user device, receiving, at the gateway device, user device traffic intended for the user device, and allocating, at the gateway device, the user device traffic to the user device data plane connections of the bonded session for the user device.

In at least some embodiments, a method includes associating, at a gateway device, a set of user device data plane connections of a user device to form a bonded session for the user device wherein the set of user device data plane sessions includes a first user device data plane connection associated with a first access network and a second user device data plane connection associated with a second access network and wherein the first user device data plane connection is supported by a data plane connection between the gateway device and an anchor node for the user device, receiving, at the gateway device, user device traffic intended for the user device, and allocating, at the gateway device, the user device traffic to the user device data plane connections of the bonded session for the user device.

BRIEF DESCRIPTION OF THE DRAWINGS

The teachings herein can be readily understood by considering the detailed description in conjunction with the accompanying drawings, in which.

To facilitate understanding, identical reference numerals have been used, where possible, to designate identical elements common to the figures.

DETAILED DESCRIPTION

Figure 1:
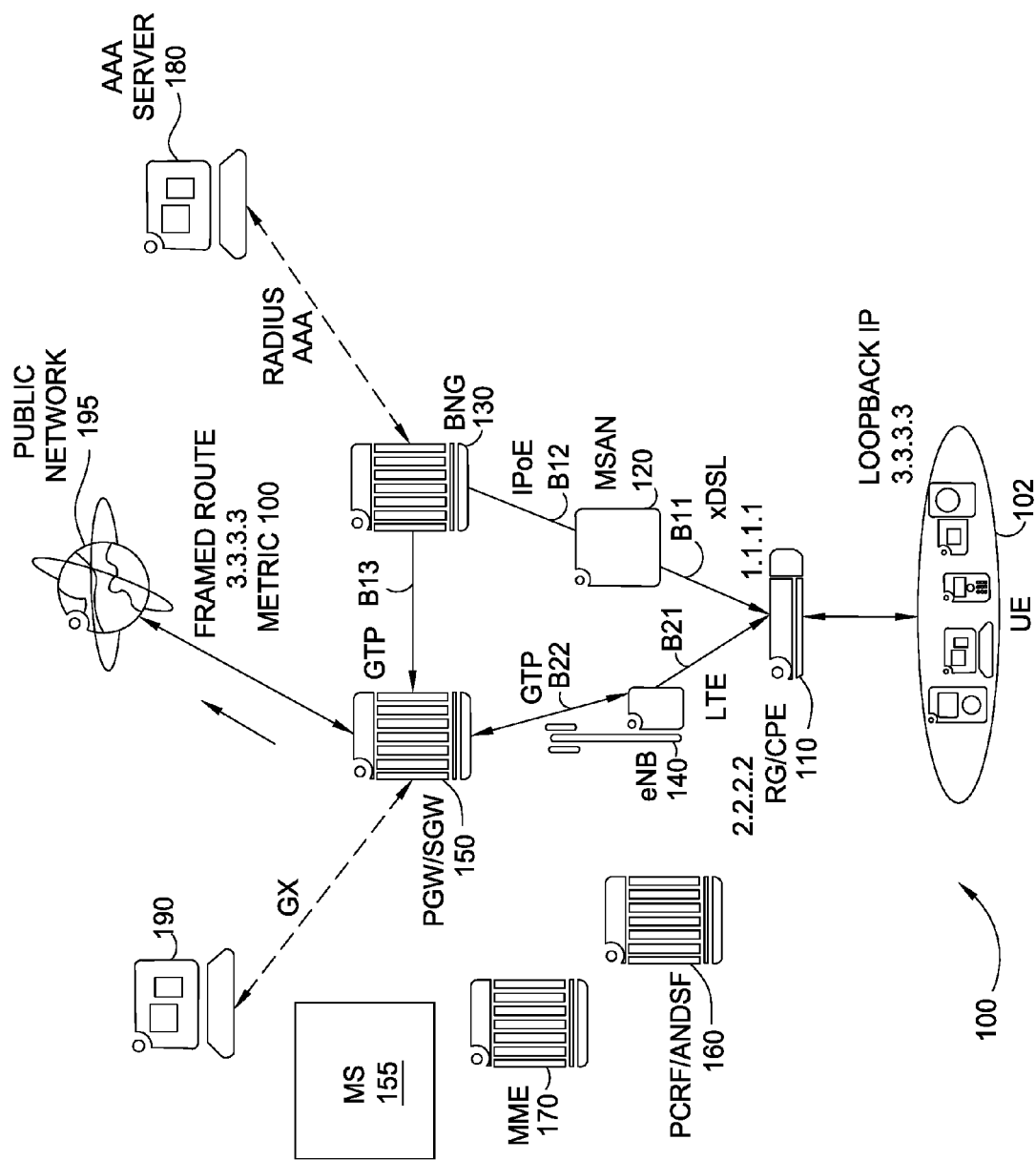
FIG. 1 depicts a high-level block diagram of a system benefiting from various embodiments.

Various embodiments are primarily described within the context of a mechanism for policy-based steering of data toward user equipment (UE) capable of receiving data via multiple paths (single-homed or multi-homed), wherein data associated with multiple service data flows (SDFs) or application flows (AFs) for a UE are allocated across multiple paths by a gateway device in accordance with policy information provided to the gateway device.

Various embodiments contemplate a policy-based downstream traffic steering mechanism operable at a gateway device, such as a Service Gateway (SGW), a Packet Gateway (PGW), or other provider equipment (PE).

Various embodiments contemplate a policy-based upstream traffic steering mechanism operable at a gateway device, such as a home or enterprise gateway device terminating paths associated with multiple different access technologies.

Various embodiments provide a mechanism for identifying and binding together multiple data bearing paths through various access technologies (e.g., Digital Subscriber Line (DSL), cable, Wi-Fi, Long Term Evolution (LTE), Third Generation (3G) wireless networks, or the like) between a PGW and Customer Premises Equipment (CPE) to form thereby a bonded service combining multiple bearers (e.g., wireless and wireline bearers, different wireless bearers associated with different Radio Access Technologies (RAT), different wireline bearers associated with different wireline access technologies, different bearers associated with different Access Technologies (ATs), or the like). The PGW allocates downstream traffic flows among multiple downstream bearers in a policy-driven manner and, optionally, the CPE may allocate upstream traffic flows among multiple upstream bearers in a policy driven manner. The bonded service operation of the PGW and CPE is not expected to be relevant to the operation of SDF and AF endpoints, such as a UEs communicating with the CPE to receive traffic from various remote/public servers.

Various embodiments advantageously operate to increase throughput between a PGW and/or Broadband Network Gateway (BNG) and a CPE such as a residential/enterprise gateway by forming a multi-bearer bonded service therebetween using various wireless and/or wireline access technologies (e.g., DSL, cable, Wi-Fi, LTE, 3G wireless, and the like). Policies may be applied, at a residential or enterprise gateway for uplink traffic and/or at a PGW/SGW or combined PGW/BNG for downlink traffic, to spread traffic among multiple bearers within the context of bonded services. Various embodiments advantageously provide inherent error redundancy.

Various embodiments adapt and enforce policies across multiple access technologies and termination points. For example, some embodiments identify and bond together all available access technologies (e.g., combined wireless and wireline) in a subscriber management system and enforce policies for the downlink traffic. Various embodiments spread traffic loads across multiple access technology bearers using various techniques, such as hashing techniques and other allocation techniques. Various features (e.g., bonded service formation and structure, allocation of traffic among bearers, and so on) may be policy driven and dynamically updated as desired by one or more entities (e.g., the network operator, a subscriber management system, a network management system, or other entity).

FIG. 1 depicts a high-level block diagram of a system benefiting from various embodiments.

The system 100 includes a User Equipment (UE) 102, a Residential Gateway/Customer Premises Equipment (RG/CPE) 110, a Multi-Service Access Node (MSAN) 120, a Broadband Network Gateway (BNG) 130, an evolved NodeB (eNodeB) 140, a combined Packet Gateway (PGW)/Serving Gateway (SGW) 150, a management system (MS) 155, a policy control entity 160, a Mobility Management Entity (MME) 170, an Authentication, Authorization and Accounting (AAA) server 180, a policy and charging enforcement function (PCEF) 190, and a public network 195. It is noted that, while system 100 of FIG. 1 is primarily described within the context of embodiments in which RG/CPE 110 comprises a Set-Top Box (STB) including both DSL and 3GPP/LTE access network capabilities, various other embodiments also are contemplated as will be discussed in more detail below. For example, within the context of a residential broadband gateway or other device, additional capacity can be added to a fixed cable television or DSL line by using LTE to increase upstream bandwidth and/or downstream bandwidth. Similarly, within the context of enterprise broadband gateway or other device, improved resilience and survivability may be provided via multiple bonded bearers.

The UE 102 may be a device such as a desktop computer, a laptop computer, a tablet computer, a set-top box, a smartphone, or any other fixed or mobile device capable of communicating with the RG/CPE 110. In various embodiments, UE 102 may be multi-homed to a gateway device (such as the PGW/SGW 150) via a first path or tunnel supported by the RG/CPE 110 and a second path or tunnel directly through a wireless access point (e.g., an eNodeB, a Wi-Fi Access Point (WAP), or other suitable wireless access point). It will be appreciated that, although primarily described with respect to a single UE 102, multiple UEs 102 may be used (illustrated in FIG. 1 as multiple example devices).

The RG/CPE 110 communicates with UE 102 to provide various network services thereto. The RG/CPE 110 is associated with, and communicates with PGW/SGW 150 via, at least two different access network technologies. As depicted in FIG. 1, the access network technologies include a wireless access network (illustratively, a 3GPP/LTE wireless access network) and a wireline access network (illustratively, an xDSL wireline access network). It will be appreciated that, while only one wireless access network and one wireline access network are shown within the context of the system 100 of FIG. 1, more and/or different access networks also may be employed within various embodiments, such as described in more detail below with respect to FIG. 3. Further, various embodiments are applicable to any combination of two or more access technologies, which access technologies may comprise wireless access networks only, wireline access networks only, or a combination of wireless access networks and wireline access networks.

The RG/CPE 110 communicates with the PGW/SGW 150 via a wireline access network (illustratively an xDSL access network) as well as a wireless access network (illustratively a Third Generation Partnership Project (3GPP)/Long Term Evolution (LTE) access network). It will be appreciated that other types of wireline access networks (e.g., optical access networks, cable access networks, or the like) and/or other types of wireless access networks (e.g., other types of cellular access networks, WiFi networks (e.g., managed WiFi access networks, unmanaged WiFi access networks, or the like), satellite links, or the like) may be used as access networks supporting a bonded service.

The xDSL access network includes MSAN 120 supporting communications between the RG/CPE 110 and BNG 130. The BNG 130 communicates with the PGW/SGW 150, as well as the AAA server 180 (illustratively, a RADIUS server). The xDSL access network may include or may be associated with various other management and/or control entities (not shown) as known to those skilled in the art. It is noted that the PGW/SGW 150 and BNG 130 are depicted in FIG. 1 as independent entities in communication with each other (illustratively, via a GTP tunnel); however, it will be appreciated that, in various embodiments, the PGW/SGW 150 and BNG 130 may be integrated within the same physical chassis to provide a converged packet core/BNG solution.

The 3GPP/LTE access network comprises eNodeBs 140 (although, for purposes of clarity, only a single eNodeB is depicted) supporting communications between the RG/CPE 110 and the PGW/SGW 150. As depicted in FIG. 1, the 3GPP/LTE access network may have associated therewith the policy control entity 160 (illustratively, implementing a Policy and Charging Rules Function (PCRF) and an Access Network Discovery and Selection Function (ANDSF) which, although depicted as a single entity or server, may be implemented in different entities or servers). As depicted in FIG. 1, 3GPP/LTE access network may have associated therewith MME 170. It will be appreciated that, while primarily discussed within the context of a 3GPP/LTE access network, various embodiments presented herein are also well suited for use with other types of wireless networks (e.g., 2G networks, 3G networks, other types of 4G networks, UMTS, EV-DO, WiMAX, 802.11, or the like, as well as various combinations thereof) and, thus, that the various elements (e.g., sites, nodes, network elements, connectors, or the like) discussed herein with respect to 3GPP/LTE embodiments also may be considered as being discussed with respect to similar elements in other wireless network embodiments (e.g., eNodeB 140 in the 3GPP/LTE access network may be referred to as a NodeB in a 3G UMTS network, PGW/SGW 150 in the 3GPP/LTE access network may be referred to as a GGSN/SGSN in a 3G UMTS network, and so forth).

In various embodiments, PGW/SGW 150 and RG/CPE 110 establish a user device data plane session therebetween in which the data plane provides two default bearers; namely, a first bearer tunnel through the first access network and a second bearer tunnel through the second access network. For example, the first bearer tunnel traversing the xDSL access network may comprise a bearer link B11 between the RG/CPE 110 and the MSAN 120, a bearer link B12 between the MSAN 120 and the BNG 130, and a bearer link B13 between the BNG 130 and the PGW/SGW 150. For example, second bearer tunnel traversing the 3GPP/LTE access network may comprise a bearer link B21 between the RG/CPE 110 and eNodeB 140 and a bearer link B22 between the eNodeB 140 and the PGW/SGW 150. In various embodiments, the tunnels, bearers, and related session/traffic signaling conform to the General Packet Radio Service (GPRS) Tunneling Protocol (GTP). It will be appreciated that the tunnels, bearers, and related session/traffic signaling alternatively or also could conform to one or more other protocols.

The PGW/SGW 150 operates to forward downstream traffic to the RG/CPE 110 via the multiple access network technologies in accordance with a policy-driven allocation between multiple downstream tunnels or bearers forming a bonded service. The RG/CPE 110 operates to forward upstream traffic to the PGW/SGW 150 via one or more of the multiple access network technologies, optionally in accordance with a policy driven allocation between multiple upstream bearers forming a bonded service.

The PCRF/ANDSF 160 implements both PCRF and ANDSF functions. The PCRF provides dynamic management capabilities by which the service provider may manage rules related to UE user or subscriber Quality of Service (QoS) requirements, rules related to charging for services provided to the UE, rules related to mobile network usage, provider equipment management, and the like. The ANDSF assists the UE 102 and the RG/CPE 110 in discovering access networks (e.g., Wi-Fi networks, 3GPP/LTE networks, and the like) and provides rules governing connection policies associated with these access networks.

The MME 170 provides mobility management functions in support of mobility of UE 102 as well as RG/CPE 110. The MME 170 may support various eNodeBs (illustratively, eNodeB 140 as well as other eNodeBs which are omitted for purposes of clarity) using respective S1-MME interfaces (omitted from FIG. 1 for purposes of clarity) which provide control plane protocols for communication between the MME 170 and the eNodeBs 140.

In various embodiments, MS 155 provides management functions for managing one or more wireless and/or wireline networks, such as one or more of the 3GPP/LTE access network, the xDSL access network, or the like. The MS 155 may communicate with the network(s) in any suitable manner. In various embodiments, for example, MS 155 may communicate with network elements via a communication path which may be in-band or out-of-band with respect to the various network elements. The MS 155 may be implemented as a general purpose computing device or specific purpose computing device, such as further described below. The MS 155 may interact with the PCRF/ANDSF 160 to provide management instructions, adapt policies, and perform various other functions.

In various embodiments, one or both of the PCRF and the ANDSF provides policy information to PGW/SGW 150 (and, optionally, RG/CPE 110) such that the PGW/SGW 150 (and, optionally, RG/CPE 110) are configured to support bonded services, provide policy-based path or bearer selection/routing rules for traffic flow assignment, and so on, as described herein with respect to the various embodiments. In various embodiments, PCRF-related actions pertain to policy delivery with respect to the PGW/SGW 150, while ANDSF-related actions pertain to policy delivery with respect to the RG/CPE 110 and/or UE 102.

In various embodiments, a mechanism for policy-based steering of user flows/applications between multiple bearers at various locations within the system 100 (e.g., at one or more of the PGW/SGW 150, the RG/CPE 110, and the UE 102) may be provided. The policies may be based upon one or more of traffic flows (e.g., streaming media, telephony, data transfer, secure session, or the like), applications (e.g., Netflix, Gmail, WebEx, or the like), entities (e.g., gold/silver/bronze level subscribers, content providers, service providers, or the like), or the like, as well as various combinations thereof. The policies may include respective policies identifying and invoking preferred access technologies.

As depicted in FIG. 1, the system 100 has associated therewith exemplary CPE-related address indicators associated with data paths useful in explaining framed route embodiments, such as described below with respect to FIGS. 4A and 4B. The depicted CPE-related address indicators include a framed route address 3.3.3.3 (as well as the capacity metric depicted as 100) for traffic between the PGW/SGW 150 and a public network 195, an xDSL link address of 1.1.1.1, an LTE link address of 2.2.2.2 and a CPE loopback address of 3.3.3.3. It is noted that the PGW/SGW 150 is an anchor point from an address perspective, allocating the same IP address to each of the bearers (e.g., 3GPP and non-3GPP access types) such that devices associated with public network 195 see only a single link to the UE 102 (even though that single link is actually composed of multiple bearers between the gateway devices serving the UE 102). It is noted that any of the various embodiments presented herein may be implemented within the various contexts adapted according to the embodiments, such as a network adapted according to any of the embodiments, a system adapted according to any of the embodiments, hardware and/or software adapted according to any of the embodiments, a management entity or network management system adapted according to any of the embodiments, a data center or computational resource adapted according to any of the embodiments, or the like.

Figure 2:
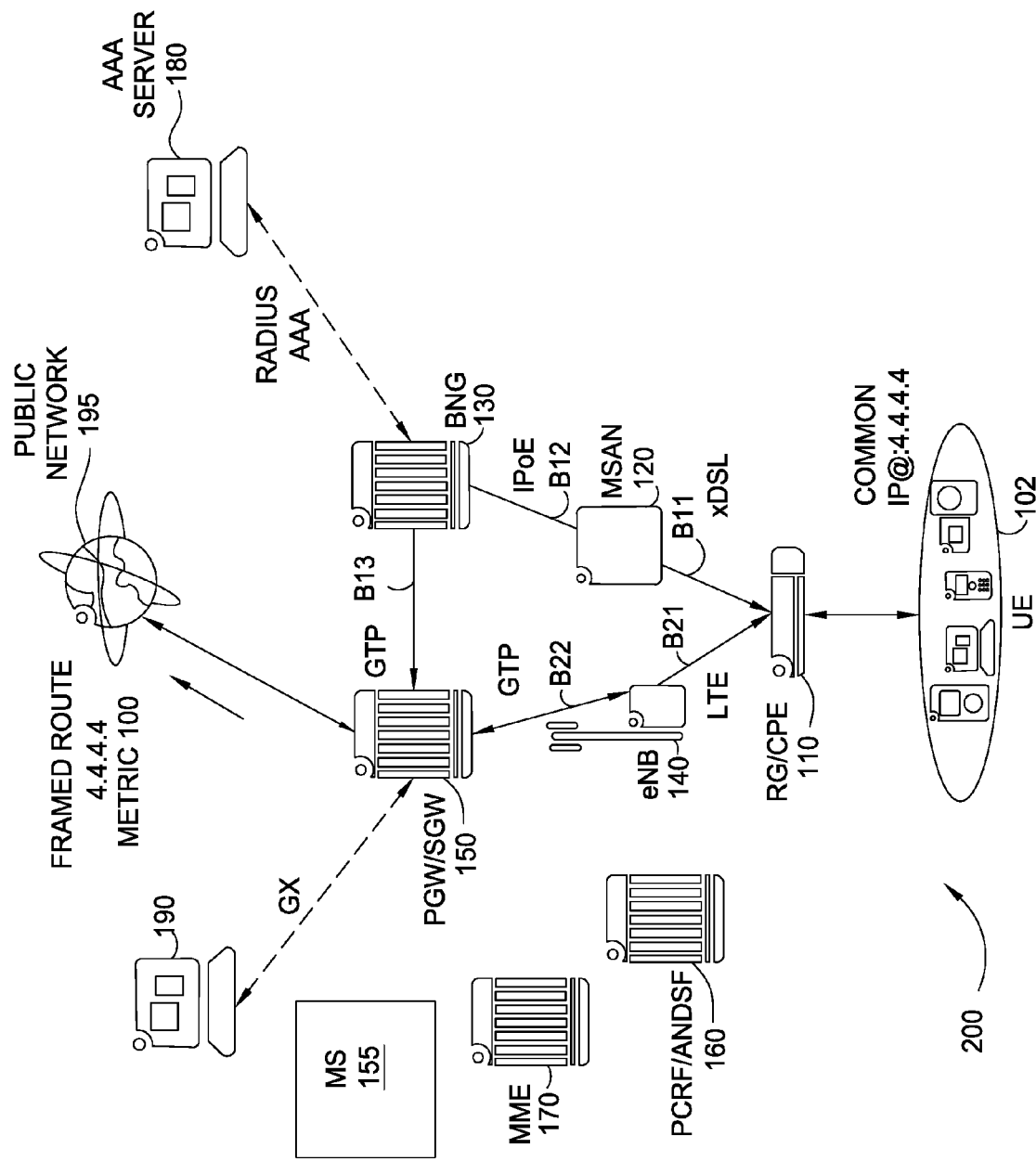
FIG. 2 depicts a high-level block diagram of a system similar to the system of FIG. 1, while also further depicting various exemplary address indicators for various embodiments that avoid problems associated with end user device interaction.

FIG. 2 depicts a high-level block diagram of a system 200 substantially the same as the system 100 depicted and described with respect to FIG. 1, with the exception that FIG. 2 further depicts various exemplary CPE-related address indicators useful in explaining embodiments that avoid problems associated with UE interaction, such as associated with IP Flow Mobility and Seamless Offload (IFOM) techniques, such as discussed in more detail below with respect to FIG. 5. The depicted CPE-related address indicators include a framed route address 4.4.4.4, which address is also used to identify the RG/CPE in each of the access networks. That is, only one address is used to identify the RG/CPE in these embodiments.

Figure 3:
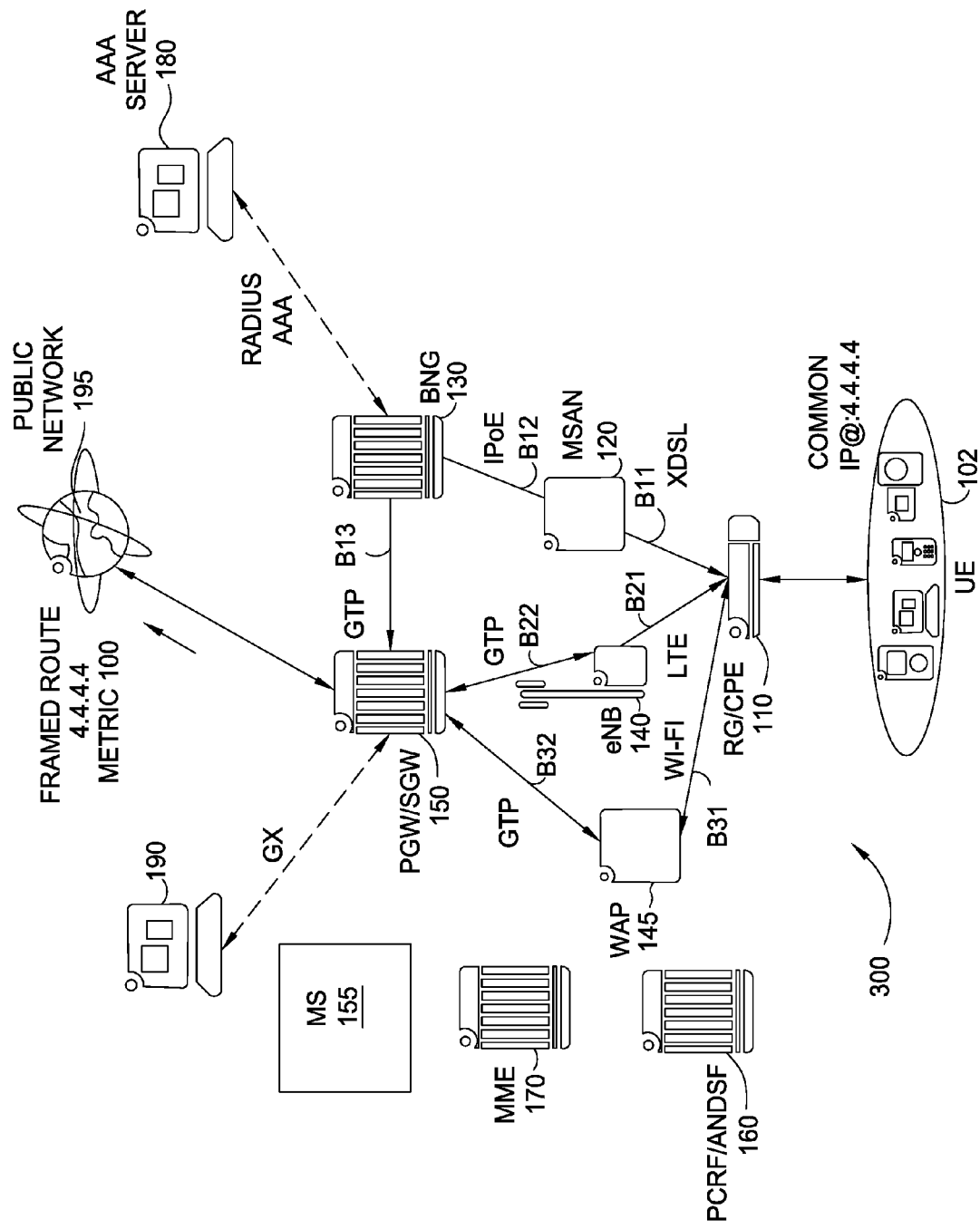
FIG. 3 depicts a high-level block diagram of a system similar to the system of FIG. 2, while also further depicting an additional access network and related bearer path.

FIG. 3 depicts a high-level block diagram of a system 300 substantially the same as the system 200 depicted and described with respect to FIG. 2, with the exception that FIG. 3 further discloses a third access network and related bearer path (namely, a Wireless Access Point (WAP) 145 communicating with the RG/CPE 110 via a bearer B31 and with the PGW/SGW 150 via a bearer B32). The various embodiments described herein with respect to allocation of traffic associated with bearers through two access networks are readily adapted where three or more bearers through multiple access networks are provided.

Generally speaking, various embodiments contemplate policy-driven allocation of traffic across multiple bearers, where each bearer is associated with a different IP Connectivity Access Network (IP-CAN). However, in various embodiments it is contemplated that some of the bearers may be associated with the same IP-CAN.

In various embodiments, bonded services are supported. In general, a bonded service may be provided by binding together multiple data bearers through multiple access technologies (e.g., DSL, cable, Wi-Fi, LTE, 3G, satellite, or the like) between a network gateway element (e.g., Packet Gateway (PGW) or other network gateway element) and an end user related device (e.g., an RG, a CPE, a UE, or the like).

In various embodiments, based on Access Point Name (APN) configuration, the PGW determines the bonded property of the APN and includes an Attribute-Value Pair (AVP) to communicate the bonded property to the PCRF in an initial Credit Control Request (CCR-I). As an example, this could re-use IP-CAN-type with new type as BONDED. Further, a Bonded IP-CAN-type means an IP-CAN session where the UE may reach the EPC (PGW) over a 3GPP-EPS IP-CAN-Type and/or over a non-3GPP-EPS IP-CAN-Type, thus with a possible simultaneous access over both IP-CAN-Types. In addition, routing decisions are taken by a gateway network element (not a UE).

In various embodiments, Gx reporting from PCEF to the PCRF may indicate whether the UE or CPA is accessing the PGW over 3GPP access, over non-3GPP access, or over both kinds of access simultaneously. The Gx interface definition may be adapted to indicate that an updated Credit Control Request (CCR-U) may contain a RAT-Type or AT-Type indicator associated with a 3GPP-EPS IP-CAN-Type or a non-3GPP-EPS IP-CAN-Type. In various embodiments, the presence of both RAT-Types in a CCR-U will not be treated as inter-RAT handover, but, rather, as addition of a RAT or AT.

In various embodiments, the PCRF includes an IP-CAN-Type in the commands sent by the PCRF such that: (1) the presence of a given IP-CAN-Type in a PCRF command is interpreted to mean that the command applies only to this IP-CAN-Type and (2) the absence of the IP-CAN-Type in a PCRF command is interpreted to mean that the command applies to all IP-CAN-Types on the bonded IP-CAN session.

In various embodiments, for UEs capable of supporting the BONDED property, the UE may communicate this property by including a new container identifier (e.g., a bonded-support-request (MS to network) and a corresponding bonded-support (network to MS)). Similarly, a UE capable of supporting primary/backup support can communicate a redundancy-support-request (e.g., MS to Network, optionally with indication of a preferred PDN connection) and can receive a redundancy support response (e.g., Network to MS).

In various embodiments, the allocation or routing decision process takes into account various factors and policies.

In various embodiments, as long as both legs of the bonded service (e.g., 3GPP and non-3GPP) are established, for one direction (e.g., uplink (UL) or downlink (DL)), a given IP flow should be carried by a unique IP leg. This operates to avoid the condition wherein TCP packets/segments with a higher SN arrive before TCP packets/segments with a lower SN which have been transmitted via a faster error.

In various embodiments, flow based routing policies are provided. Specifically, PCRF policies may associate an SDF (e.g., a set of IP filters) or an AF with a preferred IP-CAN-Type (3GPP/non-3GPP) and allocate/route accordingly.

In various embodiments, global routing policies are provided. Specifically, global routing policies may be applied when no flow-based routing policies are provided for traffic that must be allocated by, illustratively, the PGW. Some examples of global policies include:

(1) a priority and a priority throughput are associated with one IP-CAN-Type, such as a least cost IP-CAN-Type (likely to be non-3GPP (e.g., DSL));

(2) a relative load factor (%) is provided for different RAT-Type combinations (e.g., RAT-Type of 3GPP IP-CAN-Type, RAT-Type of non-3GPP IP-CAN-Type, and so on) where the relative load factor may be used in various embodiments to establish a configuration (active/stand-by) where all traffic is sent on a given IP-CAN-Type; and (3) a Priority IP-CAN-Type, in which priority throughput and relative load factors may be either locally configured on the PGW or sent by the PCRF over Gx (where, in the latter case, the priority throughput and relative load factors are associated with the Gx session and override the locally configured value(s)).

Various routing/allocation processes may be configured to subject traffic to global routing policies. In particular, in various embodiments, the PGW measures the actual throughput on each of the bearers and, as long as the actual throughput on a priority bearer or leg is below the priority throughput defined for that bearer or leg, the traffic is sent on the priority bearer or leg. Once the priority access bearer or the like is loaded up to its priority throughput threshold level, the PGW uses the relative load factor (%) associated with the IP-CAN-Type (3GPP/non-3GPP) to ensure load sharing.

In various embodiments, framed route capabilities are supported. In general, a framed route embodiment may be provided within the context of a bonded service by assigning a different address for each bearer of the bonded service, assigning a framed route address for the end device (e.g., CPE or UE) for which the bonded service is provided (e.g., CPE or UE), advertising the framed route address as a Natural Address Translation (NAT) public address of the end device, wherein remote network entities (e.g., application servers or the like) address traffic to the end device via the framed route address (NAT public address) and a gateway serving the end device is configured to address traffic to the end device via the different addresses associated with the established bearers of the bonded service. Various framed route embodiments may be further understood by way of reference to FIGS. 4A and 4B-FIG. 6.

Figure 4A:
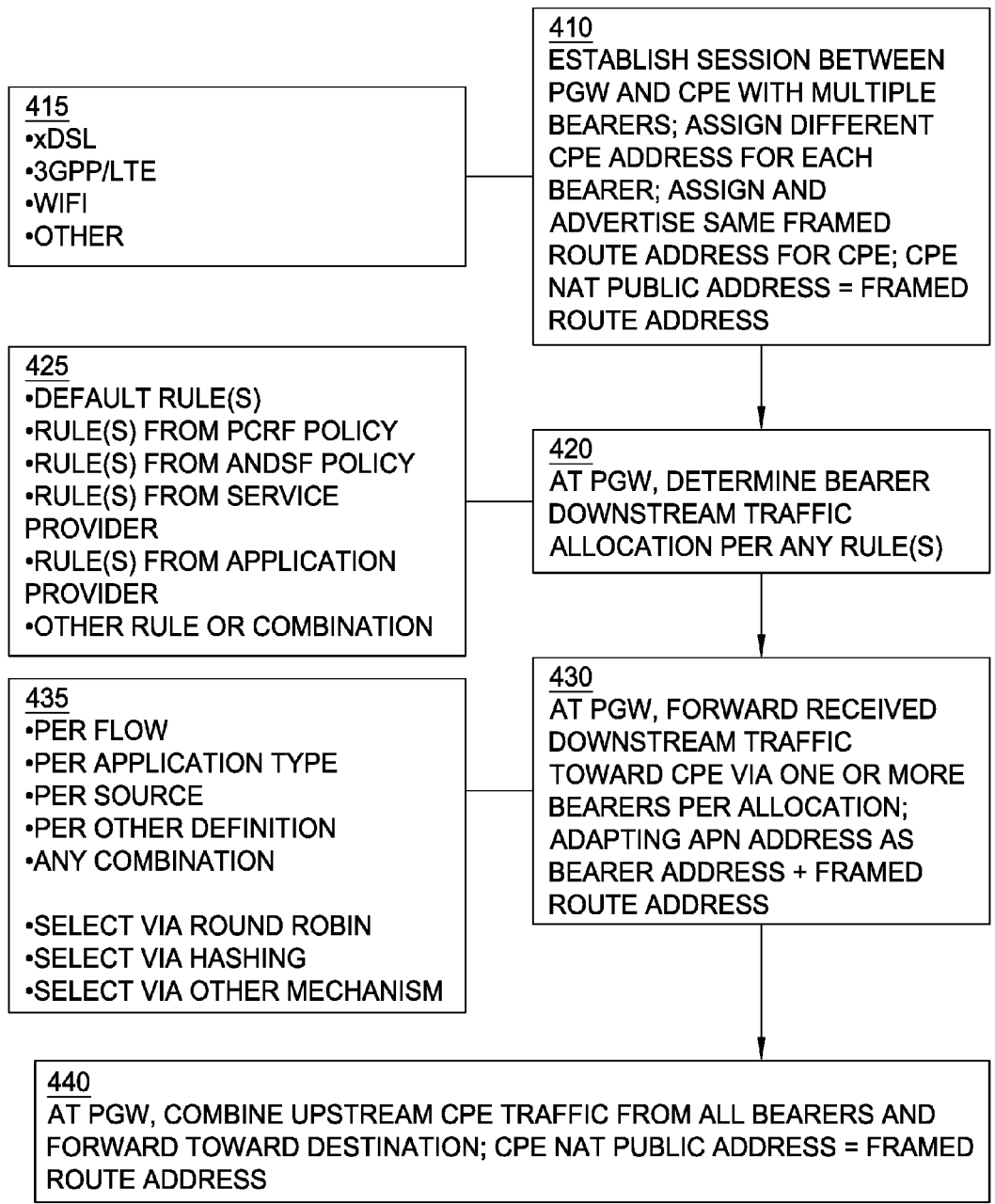
FIGS. 4A and 4B depict an exemplary embodiment of a method suitable for use within the systems of FIGS. 1-3.
Figure 4B:
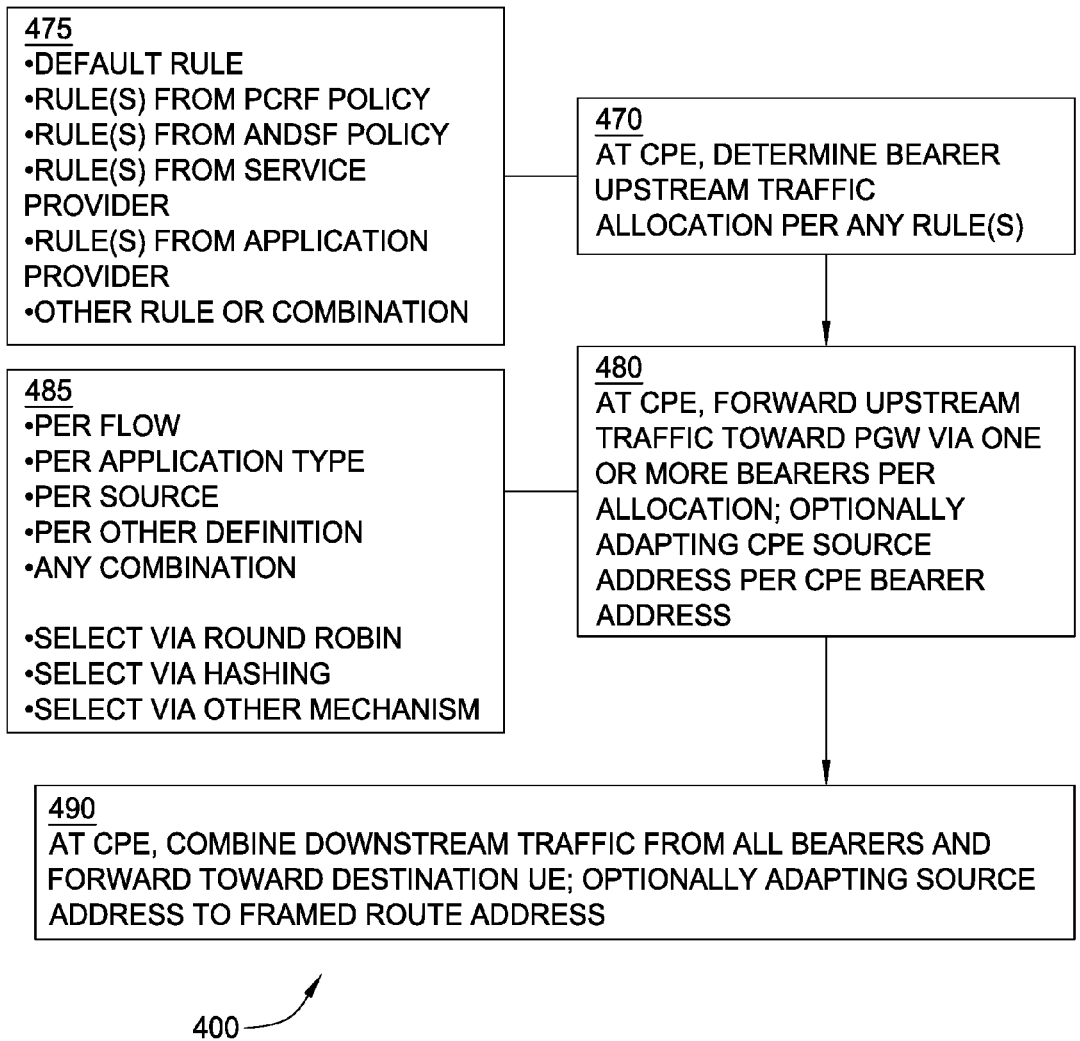

FIGS. 4A and 4B depict a flow diagram of a method according to various embodiments. Specifically, FIGS. 4A and 4B depict a framed route mechanism suitable for use within the systems of FIGS. 1-3, wherein actions performed at the PGW/SGW 150 are primarily depicted in steps 410-440 of FIG. 4A, while actions performed at the RG/CPE 110 are primarily depicted in steps 460-490 of FIG. 4B.

Referring to FIG. 4A, at step 410, a session is established between the PGW and the CPE via multiple bearers (e.g., one bearer (e.g., GTP tunnel or the like) traversing each of a wireless access network and a wireline access network therebetween). The CPE is assigned a different address for each bearer. Further, a framed route address is assigned to the CPE and advertised as the NAT public address of the CPE. In this manner, remote network entities (such as application servers and the like) address traffic to the CPE via the NAT public address (framed route address), while the PGW addresses traffic to the CPE via specific addresses associated with the established bearers. Referring to box 415, the access network may include wireline access networks such as xDSL and/or wireless access networks such as 3PP/LTE, Wi-Fi, or the like.

At step 420, the PGW determines a bearer downstream traffic allocation based on any allocation rules, such as default and/or policy-driven rules. Referring to box 425, the allocation rules may include one or more default rules, one or more rules received within policy information from a PCRF or ANDSF, one or more rules received from one or more entities (e.g., one or more rules received from a service provider, one or more rules received from an application provider, one or more rules received from one or more other entities), or the like, as well as various combinations thereof.

At step 430, the PGW forwards received downstream traffic (e.g., received from the public network 195) toward the CPE via one or more bearers in accordance with the determined bearer downstream traffic allocation. Further, the PGW adapts the APN address of the downstream traffic according to the bearer address and framed route address. Referring to box 435, the bearer downstream traffic allocation may be applied on the basis of various techniques/criteria, such as per flow, per application type, per source, per some other definition, or per any combination of these techniques/criteria. Referring to box 435, the bearer downstream traffic allocation may be performed by any mechanism, including round robin, weighted preferences, percentage, hashing, other mechanism, or per any combination of these mechanisms.

At step 440, the PGW combines upstream CPE traffic from all bearers and forwards the combined traffic toward the appropriate destination. That is, the PGW receives upstream traffic or packets from the CPE, combines the received traffic, replaces the CPE bearer-related source IP address with the NAT public address (framed route address), and forwards the combined traffic or packets toward the appropriate destination.

Generally speaking, the steps contemplated with respect to the embodiments of FIGS. 4A and 4B are suitable for use within the context of the systems described with respect to FIGS. 1-3. As an example, xDSL and LTE sessions may be provided as follows:

xDSL: IP over Ethernet (IPoE) session to the BNG→AAA assigns IMSI X based on MAC and default APN xDSL→GTPv2 session/bearer setup to PGW with IP address assignment (1.1.1.1)+framed route 3.3.3.3+Gx session; and LTE: GTPv2/bearer setup with IMSI X, APN LTE→IP address assignment (2.2.2.2)+framed route 3.3.3.3.

Thus, with respect to the PGW, two PDN sessions with the same subscriber identity (e.g., International Mobile Subscriber Identity (IMSI)) are provided, each with a different APN, wherein the same NAT public address (framed route address) is used on both PDN sessions.

In various embodiments, allocation of traffic between the two access networks may be determined by a number of methods, such as equal-cost multipath (ECMP) hashing within the context of an "any/any" PCC (Policy Control and Charging) rule. Further, other PCC rules may be provided to allocate or direct traffic either via xDSL or LTE.

In various embodiments, one NAT public address (framed route address) associated with the CPE is advertised to public network elements, such as within the context of an IPv6 framed route solution. This one NAT public address (framed route address) is used by upstream CPE traffic of the CPE as a source address for each link or bearer by which upstream traffic is communicated to the PGW.

In various embodiments, multiple public NAT addresses may be used for the CPE for multiple access networks, and upstream traffic may be passed or otherwise allocated between the multiple access networks if desired. In various embodiments, substantially all traffic is allocated to a preferential access network (e.g., the xDSL access network), while traffic in excess of a threshold amount is allocated to a secondary access network (e.g., the LTE access network). In various embodiments, upstream traffic is hashed via LTE/xDSL, IPv6 Dynamic Host Configuration Protocol (DHCP) Prefix Delegation (PD).

Referring to FIG. 4B, at step 470 the CPE determines a bearer upstream traffic allocation based on any allocation rules, such as default and/or policy-driven rules. Referring to box 475, the allocation rules may include one or more default rules, one or more rules received within policy information from a PCRF or ANDSF, one or more rules received from one or more entities (e.g., one or more rules received from a service provider, one or more rules received from an application provider, one or more rules received from one or more other entities), or the like, as well as various combinations thereof.

At step 480, the CPE forwards received upstream traffic (e.g., received from the UE 102) toward the PGW via one or more bearers in accordance with the determined upstream traffic allocation. Further, the PGW adapts the CPE source address for upstream traffic in accordance with the CPE bearer related address. Referring to box 485, the bearer upstream traffic allocation may be applied on the basis of various techniques/criteria, such as per flow, per application type, per source, per some other definition, or per any combination of these techniques/criteria. Referring to box 485, the bearer upstream traffic allocation may be performed by any mechanism, including round robin, weighted preferences, percentage, hashing, one or more other mechanisms, and/or any combination of these mechanisms.

At step 490, the CPE combines downstream traffic from all bearers and forwards the combined traffic toward the appropriate destination (e.g., toward the UE 102). That is, the CPE receives downstream traffic or packets from the PGW, combines the received downstream traffic, replaces the bearer-related source IP address with the NAT public address (framed route address), and forwards the combined traffic or packets toward their appropriate destination UE.

Figure 5:
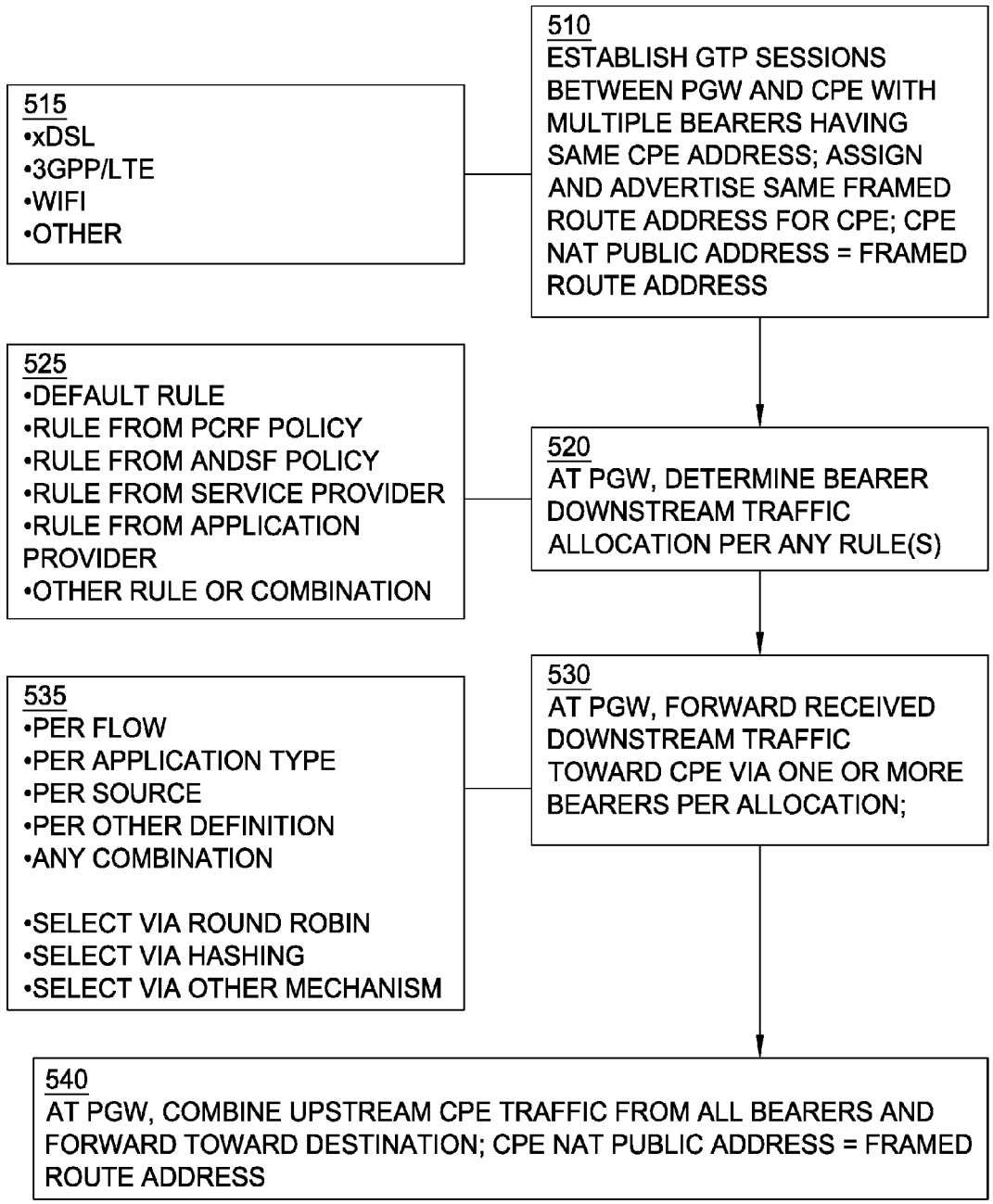
FIG. 5 depicts an exemplary embodiment of a method suitable for use within the systems of FIGS. 1-3.

FIG. 5 depicts a flow diagram of a method according to various embodiments. Specifically, FIG. 5 depicts a mechanism suitable for use within the systems of FIGS. 1-3. Specifically, FIG. 5 depicts a framed route mechanism suitable for use within the systems of FIGS. 1-3, wherein actions performed at the PGW/SGW 150 are primarily depicted in steps 510-540 of FIG. 5, while actions performed at the RG/CPE 110 are omitted from FIG. 5 since they are substantially the same as the actions performed by RG/CPE 110 in steps 450-490 of method 400 of FIG. 4B.

At step 510, a session is established between the PGW and the CPE via multiple bearers, (e.g., one bearer (e.g., GTP tunnel or the like) traversing each of a wireless access network and a wireline access network therebetween). The CPE is assigned the same IP address for each bearer. Further, the same address is used and advertised as the NAT public address of the CPE. Referring to box 515, the access network may include wireline access networks such as xDSL and/or wireless access networks such as 3PP/LTE, Wi-Fi, or the like.

At step 520, the PGW determines a bearer downstream traffic allocation based on any allocation rules, such as default and/or policy-driven rules. Referring to box 525, the allocation rules may include one or more default rules, one or more rules received within policy information from a PCRF or ANDSF, one or more rules received from one or more entities (e.g., one or more rules received from a service provider, one or more rules received from an application provider, one or more rules received from one or more other entities), or the like, as well as various combinations thereof.

At step 530, the PGW forwards received downstream traffic (e.g., received from the public network 195) toward the CPE via one or more bearers in accordance with the determined bearer downstream traffic allocation. Further, the PGW adapts the APN address of the downstream traffic according to the bearer address and framed route address. Referring to box 535, the bearer downstream traffic allocation may be applied on the basis of various techniques/criteria, such as per flow, per application type, per source, per some other definition or per any combination of these techniques/criteria. Referring to box 535, the bearer downstream traffic allocation may be performed by any mechanism, including round robin, weighted preferences, percentage, hashing, other mechanism, or per any combination of these mechanisms.

At step 540, the PGW combines upstream CPE traffic from all bearers and forwards the combined traffic toward the appropriate destination. That is, the PGW receives upstream traffic or packets from the PE, combines the received traffic, replaces the CPE bearer-related source IP address with the NAT public address (framed route address), and forwards the combined traffic or packets toward the appropriate destination.

Generally speaking, the steps contemplated with respect to the embodiments of FIG. 5 are suitable for use within the context of the systems described with respect to FIGS. 1-3. As an example, xDSL and LTE sessions may be provided as follows:

xDSL: IPoE session to the BNG→AAA assigns IMSI X based on MAC and APN Y→GTPv2 session/bearer setup to PGW with IP address assignment (4.4.4.4)+Gx session; and LTE: GTPv2/bearer setup with IMSI X, APN Y→IP address assignment (4.4.4.4).

Thus, with respect to the PGW, there are provided two bearers on given PDN sessions.

In various embodiments, allocation of traffic between the two access networks may be determined by a number of methods, such as ECMP hashing within the context of an "any/any" PCC rule. Further, other Policy Control and Charging (PCC) rules may be provided to allocate or direct traffic either via xDSL or LTE.

In various embodiments, one NAT public address (framed route address) associated with the CPE is advertised to public network elements. This one NAT public address (framed route address) is used by upstream CPE traffic of the CPE as a source address for each link or bearer by which upstream traffic is communicated to the PGW.

In various embodiments, multiple public NAT addresses may be used for the CPE for multiple access networks, and upstream traffic may be passed or otherwise allocated between the multiple access networks if desired. In various embodiments, substantially all traffic is allocated to a preferential access network (e.g., the xDSL access network), while traffic in excess of a threshold amount is allocated to a secondary access network (e.g., the LTE access network). In various embodiments, upstream traffic is hashed via LTE/xDSL, IPv6 DHCP PD. In various embodiments, a default any/any rules is hashed across both PDN sessions.

As noted herein, within the context of the method 500 of FIG. 5, the CPE operates in substantially the same manner as that described herein with respect to FIG. 4B.

Figure 6:
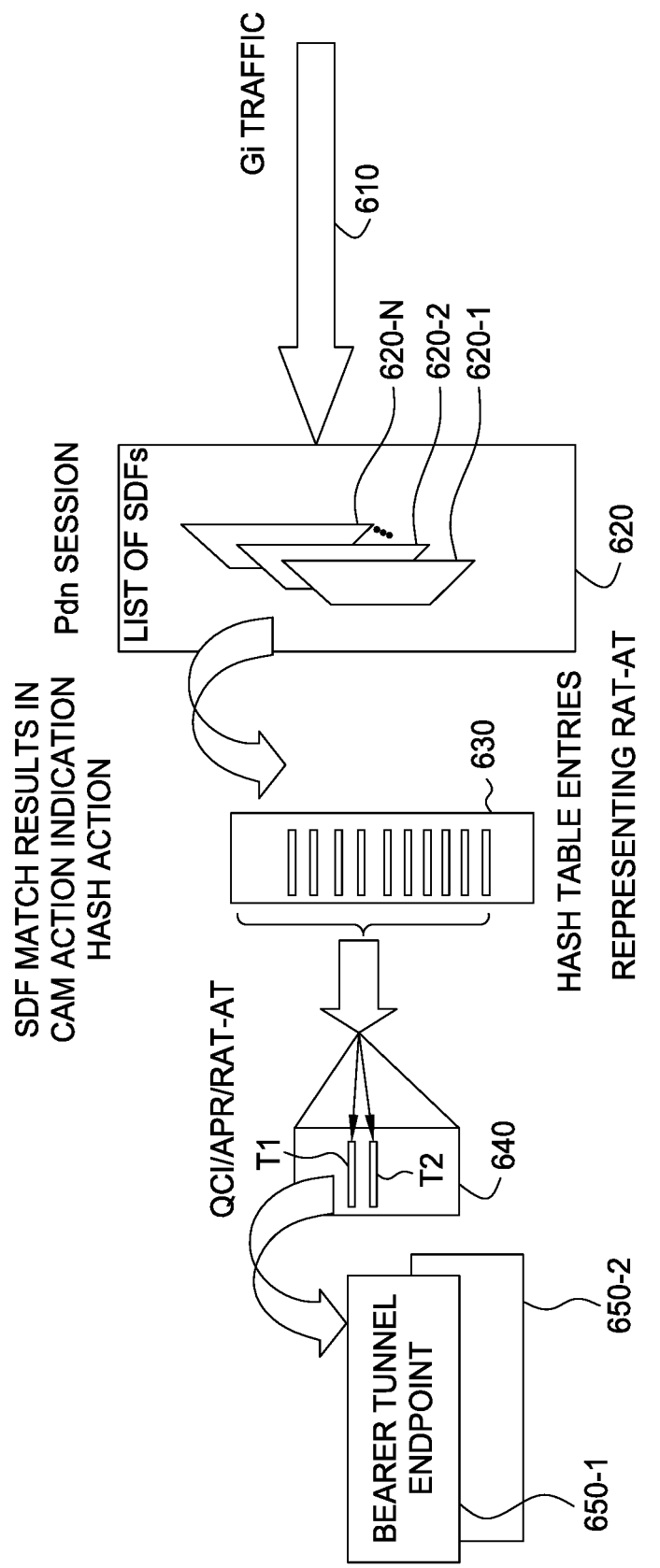
FIG. 6 depicts a graphical representation of a data plane model useful in understanding various embodiments.

FIG. 6 depicts a graphical representation of a data plane model useful in understanding various embodiments. Specifically, FIG. 6 depicts a data plane processing model suitable for understanding access network traffic allocation processes occurring at various elements (e.g., the PGW, the CPE, or one or more other devices) in accordance within the various embodiments. Referring to FIG. 6, Gi traffic or other traffic 610 is received by a device operating in accordance with various embodiments presented herein. The packet data network session 620 may include a plurality of Service Data Flows (SDFs) depicted as SDFs 620-1 through 620-N.

In various embodiments, each of the SDFs is associated with identification information or other information useful in hashing the SDF or portions thereof such that the SDF or portions thereof may be allocated to one or more of a plurality of bearers in communication with a destination device, such as a CPE device for downstream traffic or a PGW for upstream traffic.

In various embodiments, each of the SDFs is associated with a QoS Class Indicator (QCI)/Address Resolution Protocol (ARP) key (denoted as a QCI/ARP key). The QCI/ARP key may be used within the context of hashing an SDF or portion thereof to thereby allocate the SDF or portion thereof to a particular bearer in communication with the destination device. That is, an entry in a hash table 630, responsive to hashing the SDF or portion thereof, indicates the appropriate bearer for communicating the SDF or portion thereof to the destination device. This indication may take the form of, illustratively, a RAT indicator or, more generally, an AT indicator. The RAT/AT indicator may be added to the existing QCI/ARP key to form a QCI/ARP/RAT (or QCI/ARP/AT) key, which key may be used to direct the SDF or portion thereof to the appropriate bearer in communication with the destination device (e.g., one of tunnels T1 and T2 within a plurality of bearers 640 configured to forward traffic to the appropriate bearer tunnel endpoint (e.g., 650-1 or 650-2)) and, thus, to the appropriate destination device (e.g., UE or other destination device).

In various embodiments, "traffic hash profiles" may be configured to describe the traffic distribution across the different types of access networks. For example, a default traffic hash profile may provide for 100%/0% distribution wherein a first access type receives 100% of traffic while the second access type receives 0% traffic. The hash profiles may be expanded to include more than two access types. Various embodiments contemplate default profiles of 100%/0% for each access network.

Generally speaking, a bonded service according to various embodiments is implemented with a user device data plane session having two or more default bearers capable of carrying traffic flows for a subscriber (e.g., SDFs or portions thereof). As previously discussed, allocation of traffic to the various bearers may be policy-driven. The allocation of traffic to the various bearers may be implemented using hashing or any other mechanism suitable for selectively routing traffic flows, such as SDFs or portions thereof, to various upstream or downstream endpoints.

In various embodiments, a bonded service may be defined as a service where: (1) a UE or RG/CPE is simultaneously served by the same IP address over both 3GPP and non-3GPP access networks and (2) the PGW (not the UE) determines which IP-CAN-Type to use for a given DL IP flow. In various embodiments, UE multi-homing is provided wherein the PGW is better positioned than the UE to determine which IP-CAN-Type to use for a given DL IP flow. Generally speaking, this may happen when the UE (or RG/CPE) is served by 3GPP and non-3GPP access networks that are stable enough such that there is no issue as to whether the network chooses the IP-CAN-Type to use for a given DL IP flow and (2) the UE or RG/CPE cannot or does not have SDF or application flow knowledge. In these embodiments, the PGW may base the decision on (dynamic) PCRF policies or on information from AAA server.

It is noted that one embodiment is well suited for use within the context of the PGW simultaneously connected to a RG/CPE via both DSL (a DSL bearer) and LTE (an LTE bearer), wherein upstream and/or downstream traffic is preferentially routed via the DSL bearer to threshold level approaching a maximum bandwidth of, illustratively, 100 Mb per second, and wherein further traffic is routed via the LTE bearer.

It is noted that various embodiments discussed herein may be applicable to numerous applications, such as supporting faster handover (HO) between 3GPP and non-3GPP. That is, when a PDN connection is simultaneously set up on both 3GPP and non-3GPP access networks, a sudden loss of access via a primary access network does not induce a service interruption gap for the UE to attempt a recovery operation by setting up the PDN connection again on the other access network. In this case, the various access networks may operate in active/standby mode or in active/active mode, wherein active/active mode supports a higher throughput.

In various embodiments, a bonded service may be associated with a UE that is multi-homed for a given IP-CAN session. However, there is one single IP-CAN session associated with the IP address/IPv6 Prefix of the UE. In this manner, the single IP-CAN session providing multiple data plane sessions allows for simple flow management for charging (e.g., via Gy interface, Gz/Rf/Ga interfaces, or the like) and lawful interception (LI) interfaces, for traffic detection function (TDF) interactions, and so forth.

In various embodiments, the bonded service provides the PGW control over DL routing decisions based on PCRF instructions (thus needing the creation of a new AVP over the Gx interface). Within the context of various embodiments, the routing decisions are communicated to the PCRF via a Routing-Rule-Install AVP. The PCRF may use this information to create/update/delete PCC rules.

It is noted that the various embodiments described herein generally relate to a use case wherein a CPE has both DSL and LTE access capability, such as at a residential or enterprise gateway. These embodiments provide a mechanism by which LTE bearers, when bonded with DSL bearers, provide additional bandwidth and resiliency to customers as discussed herein.

Various embodiments contemplate 3GPP/LTE/Wi-Fi/DSL bonding services in multiple combination. For example, the various LTE/DSL bonding services described herein may be equally applicable to Wi-Fi/LTE bonding, Wi-Fi/3GPP bonding, Wi-Fi/LTE/DSL bonding, DSL/satellite bonding, or various other multiple access network bonding services in which a single IP address is used for each of the multiple access bearers or sessions of the UE. A description of an embodiment of Wi-Fi/LTE bonding, in which the UE (or RG/CPE) uses both LTE and Wi-Fi together as part of a bonded service, follows. Advantageously, by assigning one IP address to the UE for use in both LTE as well as trusted Wi-Fi access, unwanted inter-RAT handover problems may be avoided. To illustrate, at present, if a UE such as a handset is enabled to have both LTE and Wi-Fi access, it is assumed that both connections receive separate IP addresses; however, in the case of a trusted WLAN where the handset communications via Wi-Fi are sent to the same PGW as LTE communications, the PGW may treat data received via multiple access networks as indicating a need for inter-RAT handover such that the PGW tears down the LTE session. Since the handset is not expecting to be disconnected from the LTE connection, the handset attempts to reconnect to the PGW, thereby triggering at the PGW an inter-RAT handover from Wi-Fi to LTE. It is noted that, in various such bonded services, allocating the same IP address for multiple connections helps in limiting address space usage without impacting the core routing domain.

In various embodiments, bonded services may be utilized within an enterprise context to support a resilient enterprise CPE (e.g., router or edge gateway (EG)) pair or group. In this manner, bonding services may be adapted to improve enterprise resiliency. For example, assume that an enterprise network includes two routers connected to a PGW for resiliency purposes. It is noted that each of these two routers typically would be identified by a separate subscriber identifier (e.g., an International Mobile Subscriber Identifier (IMSI) or other suitable identifier). That is, in contrast to the single CPE examples discussed herein, each of the routers (CPEs) forming the resilient router pair is associated with a respective subscriber identifier (e.g., IMSIs) such that there are two disparate connections identifying two different subscriber identifiers (e.g., IMSIs) which may be bonded together as well to give resilience or a traffic distribution preference. Various enterprise resilient CPE pair embodiments may be further understood by way of reference to FIG. 7.

Figure 7:
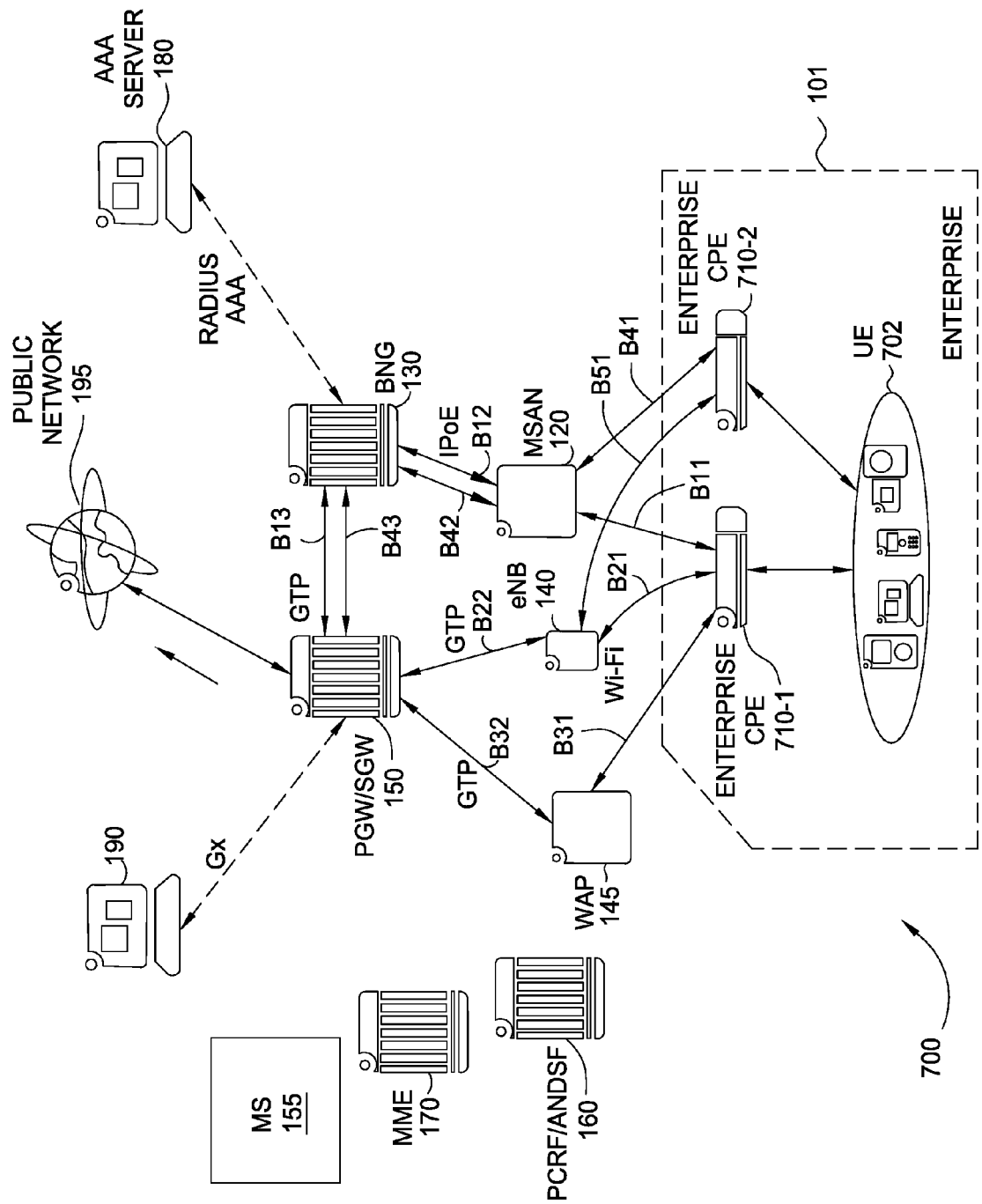
FIG. 7 depicts a high-level block diagram of a similar to the system of FIG. 3, while also further depicting an additional end user device.

FIG. 7 depicts a high-level block diagram of a system 700 substantially the same as the system 300 depicted and described with respect to FIG. 3, with the exception that FIG. 7 further discloses a second CPE. As depicted in FIG. 7, an enterprise 701 includes a first enterprise CPE 710-1 (e.g., a first enterprise router or edge gateway (EG)) and a second enterprise CPE 710-2 (e.g., a second enterprise router or edge gateway (EG)), which may be referred to collectively as enterprise CPEs 710. The enterprise CPEs 710 form a resilient enterprise CPE pair (e.g., a resilient enterprise router pair or EG pair). As depicted in FIG. 7, each of the enterprise CPEs 710 (e.g., enterprise routers) is configured to communicate with the UE 702 (or with different UEs 102 where multiple UEs 102 are supported).

The first enterprise CPE 710-1 is associated with a first subscriber identifier (e.g., IMSI) and receives bonded services including bearer paths through DSL (B11, B12, B13), LTE (B21, B22) and Wi-Fi (B31, B32) access technologies. It is noted that the bonded services are provided to first enterprise CPE 710-1 in the manner described herein with respect to the various figures.

The second enterprise CPE 710-2 is associated with a second subscriber identifier (e.g., IMSI) and receives bonded services including bearer paths through DSL (B41, B42, B43) and LTE (B51, B52) access technologies. It is noted that the bonded services are provided to second enterprise CPE 710-2 in the manner described herein with respect to the various figures.

In FIG. 7, the PGW/SGW 150 provides a bonded session for the connections of the first enterprise CPE 1710-1 and the connections of the second enterprise CPE 710-2 to form thereby a resilient bonded session. More specifically, PGW/SGW 150 identifies that both connections are associated with enterprise 701 and, therefore, that traffic destined for the UE 702 within the enterprise 701 may be provided via one or both of the first and second enterprise CPEs 110. In some embodiments, in which enterprise 701 includes multiple UEs 702, each of the enterprise CPEs 110 communicates with any of the UEs 702. In some embodiments, in which enterprise 701 includes multiple UEs 702, each of the enterprise CPEs 710 communicates with a subset of the UEs 102, which subset may overlap to include one or more commonly serviced UEs 702. In various embodiments, a resilient bonded session may allocate traffic among any of the bearers servicing the enterprise CPEs 710. In various embodiments, one of the enterprise CPEs 710 may operate as a primary/active enterprise CPE 710, while the other enterprise CPE 710 operates as a secondary/standby enterprise CPE 710. Various other configurations will also be appreciated by those skilled in the art.

In various embodiments, connections from multiple routers, such as routers serving a common enterprise or portion thereof, may be bonded together. In various embodiments, a bonded resilience Information Element (IE) may be associated with priority information, enterprise identification information, and/or other information or parameters.

Various embodiments contemplate providing a bonded service by (1) determining, at a gateway device configured to support a UE data plane session having multiple bearers, an allocation of UE traffic communicated by the multiple bearers according to policy information received by the gateway device, wherein each bearer is associated with a different access network (e.g., IP-CAN and (2) adapting UE traffic communicated via the multiple bearers according to the determined allocation of UE traffic. The UE traffic may include any type of traffic, such as SDFs, AFs, and the like. The access networks (e.g., IP-CANs) may include any type of access network technologies, such as DSL, WiFi, WiMAX, 3GPP/LTE, cable television, or the like. The allocating may be determined based on a maximum fill link traffic allocation capability that uses active traffic monitoring and policy information for traffic allocation, as depicted and described with respect to FIG. 8 and FIG. 9. The allocating of the UE traffic across the bearers based on the determined allocation may be implemented on a per-flow basis (e.g., by hashing on flows to direct flows to the bearers), for traffic independent of flows (e.g., by hashing the traffic to spread the traffic across the multiple bearers, or at other levels of granularity. In various embodiments, policy information pertaining to downstream traffic allocation across bearers may be provided to the PGW/SGW via one or both of a PCRF or ANDSF. In various embodiments, policy information pertaining to upstream traffic allocation across bearers may be provided to the CPE or the UE via one or both of the PCRF or ANDSF, or via communications propagated to the CPE or the UE from the PGW/SGW. In various embodiments, downstream or upstream traffic allocations among the multiple bearers may be adapted in response to one or more of access technology congestion levels, updated policies, updated service level agreement (SLA) requirements, and so forth.

It is noted that various embodiments contemplate an apparatus including a processor and memory, where the processor is configured to establish multiple-bearer data sessions, allocate traffic among the various bearers of the multiple-bearer data sessions, interact with policy control entities, and generally perform the functions described herein with respect to the PGW processing of downstream traffic, CPE or UE processing of upstream traffic, and so forth. The processor is configured to perform the various functions as described, as well communicate with other entities/apparatuses including respective processors and memories, to exchange control plane and data plane information in accordance with the various embodiments.

As discussed herein, bonded sessions may be supported within various contexts, including at a GW node configured to operate as an anchor node from the network perspective (which also may be referred to herein as an anchor GW node or a BOOST GW with anchor node) or at a GW node that is not operating as an anchor node from the network perspective (which also may be referred to herein as a non-anchor GW node or a BOOST GW without anchor node). In at least some embodiments, a BOOST GW may use a bonded session to boost the performance of an application (e.g., by sending uplink traffic over an LTE connection and using a WiFi connection for downlink traffic), such that the core IP network and UE application view the different connections as a single connection. The BOOST GW functions can be implemented using anchor node and non-anchor node configurations. In at least some embodiments, a BOOST GW with anchor node includes address allocation and bonding functions, whereas a BOOST GW without anchor node has only bonding functions (with address allocation functions still being performed by the anchor node, such as the associated GGSN, PGW, or other anchor node depending on the type of wireless communication system).

In at least some embodiments, as discussed herein (e.g., with respect to FIGS. 1-7), a bonded session may be supported at a GW node configured to operate as an anchor node from the network perspective. For example, a bonded session may be supported at an anchor GW node such as a Gateway GPRS Support Node in a 3G UMTS network, a PGW in an LTE network, or the like.

In at least some embodiments, as discussed further below, a bonded session may be supported at a GW node that is not operating as an anchor node from the network perspective. For example, a bonded session may be supported at a non-anchor GW node such as a non-anchor GW node having a combination of SGW functionality (for 4G cellular access) and Trusted Wireless Access Gateway (TWAG) functionality (for trusted WiFi access), a non-anchor gateway node having a combination of SGW functionality (for 4G cellular access) and Enhanced Packet Data Gateway (ePDG) functionality (for untrusted WiFi access), a non-anchor GW node having a combination of SGW functionality (for 4G cellular access) and trusted and untrusted WiFi access (e.g., TWAG/ePDG functionality), a non-anchor GW node having a combination of SGSN functionality (for 3G cellular access) and Wireless Access Gateway (WAG) functionality (for WiFi access), or the like, as well as various combinations thereof. In at least some embodiments, a bonded session at a non-anchor GW node may support bonding of a cellular connection (e.g., a 3G connection, a 4G connection, or the like) and a non-cellular connection (e.g., a trusted WiFi connection, an untrusted WiFi connection, or the like) where the address (e.g., IP address) for the bonded session may be received by the non-anchor GW node from the associated anchor node for the non-anchor GW node. Various embodiments for supporting a bonded session at a non-anchor gateway node may be further understood by way of reference to the exemplary wireless communication system of FIG. 8.

Figure 8:
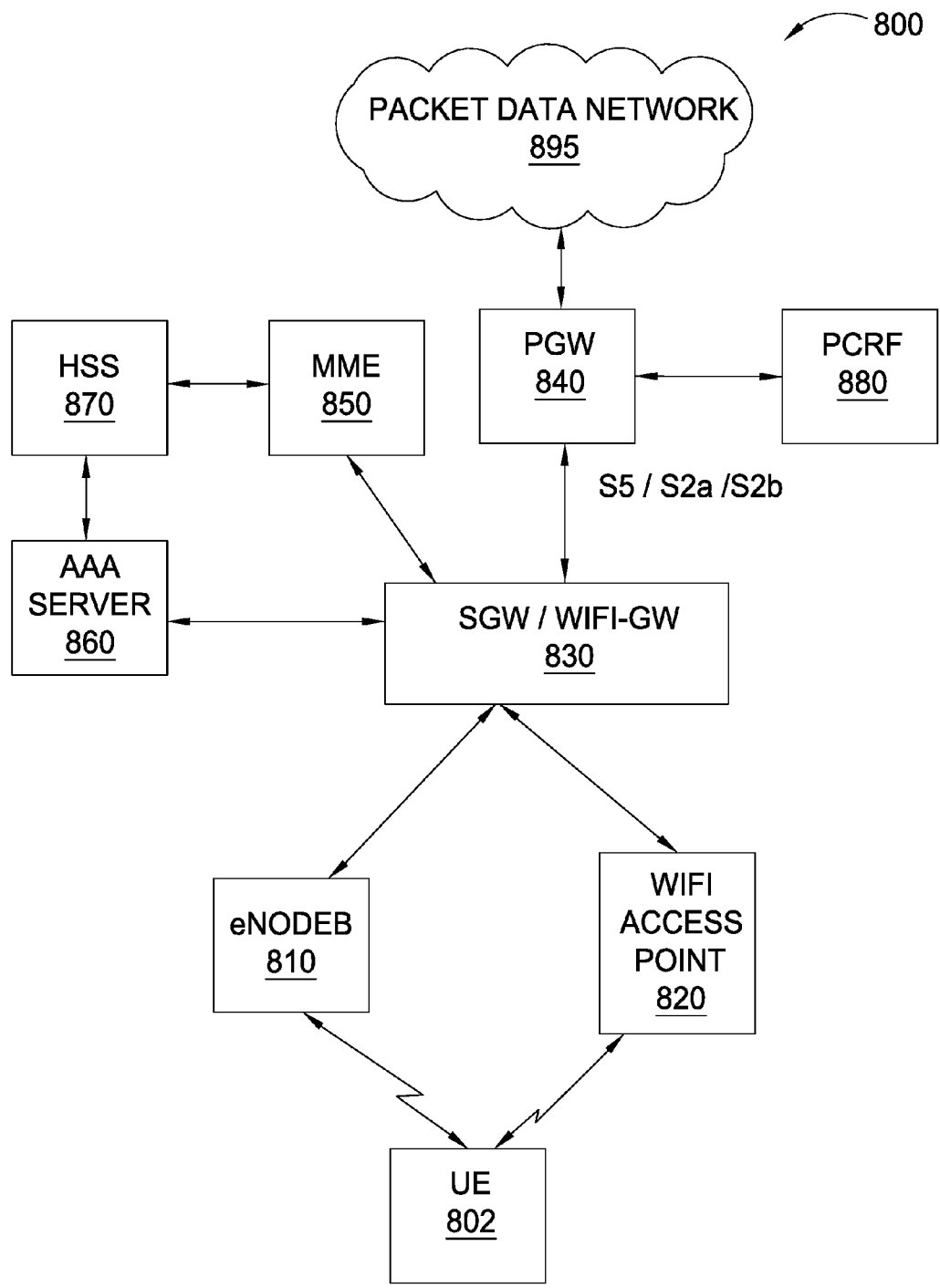
FIG. 8 depicts an exemplary wireless communication system including a non-anchor gateway node configured to support a bonded session.

FIG. 8 depicts an exemplary wireless communication system including a non-anchor GW node configured to support a bonded session.

The wireless communication system 800 includes a UE 802, an eNodeB 810, a WIFI access point (WAP) 820, an SGW/WiFi-GW 830, a PGW 840, an MME 850, an AAA server 860, an HSS 870, a PCRF 880, and a packet data network (PDN) 895. The UE 802 is a dual-mode wireless device that is configured to support cellular-based wireless communications via eNodeB 820 and WiFi-based wireless communications via WAP 820. The eNodeB 810 is a cellular access point and is communicatively connected to SGW/WiFi-GW 830. The WAP 820 is a WiFi access point and is communicatively connected to SGW/WiFi-GW 830. The WAP 820 may be configured to support trusted WiFi communications, in which case the WiFi-GW functions of SGW/WiFi-GW 830 may include Trusted Wireless Access Gateway (TWAG) functionality for trusted WiFi access. The WAP 820 may be configured to support untrusted WiFi communications, in which case the WiFi-GW functions of SGW/WiFi-GW 830 may include Enhanced Packet Data Gateway (ePDG) functionality for untrusted WiFi access. The SGW/WiFi-GW 830 is communicatively connected to PGW 840, which is configured to operate as a gateway for traffic between SGW/WiFi-GW 830 and PDN 895. The SGW/WiFi-GW 830 also is communicatively connected to MME 850 and AAA server 860. The PGW 840 is communicatively connected to PCRF 880. The PGW 840, as discussed herein, is configured to operate as a gateway for traffic between SGW/WiFi-GW 830 and PDN 895. The PDN 895 may be any suitable type of packet data network accessible via PGW 840, such as a public data network (e.g., the Internet), a private data network, or the like). It will be appreciated that various other types of communications between elements of wireless communication system 800 may be supported.

The SGW/WiFi-GW 830 is not an anchor node for UE 802 (and, thus, may be referred to more generally as a non-anchor GW node); rather, PGW 840 is configured to operate as the anchor node for UE 802 (and, thus, may be referred to more generally as an anchor node).

The SGW/WiFi-GW 830 is a combined cellular/WiFi gateway device that is configured to support a bonded session for UE 802. The bonded session may be a bonding of a cellular connection (via eNodeB 810) and a trusted WiFi connection (via WAP 820, where WAP 820 is a trusted WAP), a bonding of a cellular connection (via eNodeB 810) and an untrusted WiFi connection (via WAP 820, where WAP 820 is an untrusted WAP), or the like.

The SGW/WiFi-GW 830 is configured to support establishment of the bonded session for UE 802. As discussed herein, a bonded session uses a single IP address for the connections that are bonded to form the bonded session. The SGW/WiFi-GW 830, however, since it is not an anchor node for UE 802, is not configured to assign IP addresses to connections of the UE 802 (including connections which are bonded to form the bonded session); rather, the PGW 840 provides this IP address assignment function since it is operating as the anchor for UE 802. The SGW/WiFi-GW 830, since it does not assign the IP addresses to the connections which are associated to form the bonded session of UE 802, obtains an IP address to be used as the IP address for the bonded session of UE 802. The SGW/WiFi-GW 830 may obtain the IP address for the bonded session of UE 802 from the anchor node for UE 802 (e.g., by requesting the IP address from the PGW 840, which is operating as the anchor node for UE 802). The SGW/WiFi-GW 830 may obtain the IP address for the bonded session of UE 802 in various ways, such as by using an IP address learned from establishment of the connections which are bonded at the SGW/WiFi-GW 830 to form the bonded session for UE 802 (e.g., reusing the IP address learned over the cellular/S5 connection where the cellular/S5 connection is setup first, reusing the IP address learned over the WiFi/S2a/S2b connection where the WiFi/S2a/S2b connection is setup first, reusing whichever IP address was learned first or most recently, or the like), selecting one of the IP addresses learned from establishment of the connections which are bonded at the SGW/WiFi-GW 830 to form the bonded session for UE 802 (e.g., selecting between the IP address learned for cellular connection and the IP address learned for the WiFi connection, which may be selected based on whichever IP address was learned first, whichever IP address was learned most recently, or the like), or the like, as well as various combinations thereof.

The SGW/WiFi-GW 830, where the cellular connection for the UE 802 is established first (which may include obtaining an IP address for the cellular connection from the anchor node for the UE 802 (e.g., PGW 840) via the S5 connection), upon receiving an indication of a request for a WiFi connection for the UE 802, may send a request to the PGW 840 to also obtain an IP address for the WiFi connection of the UE 802 (e.g., by sending a CS request to the anchor node for the UE 802 via S2a for a trusted WiFi connection or by sending a CS request to the anchor node for the UE 802 via S2b for a non-trusted WiFi connection) and may then select one of the two IP addresses assigned for the UE 802 (e.g., for the cellular connection or the WiFi connection) as the IP address to be used for the bonded session of UE 802.

The SGW/WiFi-GW 830, where the cellular connection for the UE 802 is established first (which may include obtaining an IP address for the cellular connection from the anchor node for the UE 802 (e.g., PGW 840) via the S5 connection), upon receiving an indication of a request for a WiFi connection for the UE 802, may suppress or prevent the sending of a request to the PGW 840 to also obtain an IP address for the WiFi connection of the UE 802, may terminate the WiFi connection of the UE 802 at SGW/WiFi-GW 830 (again, without sending a CS request to the anchor node for the UE 802 for the WiFi connection), bond the WiFi connection with the cellular connection at the SGW/WiFi-GW 830 to form the bonded session of UE 802, and reuse the IP address obtained for the cellular connection as the IP address of the bonded session of UE 802.

The SGW/WiFi-GW 830, where the WiFi connection for the UE 802 is established first (which may include obtaining an IP address for the WiFi connection from the anchor node for the UE 802 (e.g., PGW 840) via the S2a connection for a trusted WiFi connection or via the S2b connection for a non-trusted WiFi connection), upon receiving an indication of a request for a cellular connection for the UE 802, may send a request to the PGW 840 to also obtain an IP address for the cellular connection of the UE 802 (e.g., by sending a CS request to the anchor node for the UE 802 via S5 for the cellular connection) and may then select one of the two IP addresses assigned for the UE 802 (e.g., for the WiFi connection or the cellular connection) as the IP address to be used for the bonded session of UE 802.

The SGW/WiFi-GW 830, where the WiFi connection for the UE 802 is established first (which may include obtaining an IP address for the WiFi connection from the anchor node for the UE 802 (e.g., PGW 840) via the S2a connection for a trusted WiFi connection or via the S2b connection for a non-trusted WiFi connection), upon receiving an indication of a request for a cellular connection for the UE 802, may suppress or prevent the sending of a request to the PGW 840 to also obtain an IP address for the cellular connection of the UE 802, may terminate the cellular connection of the UE 802 at SGW/WiFi-GW 830 (again, without sending a CS request to the anchor node for the UE 802 for the cellular connection), bond the cellular connection with the WiFi connection at the SGW/WiFi-GW 830 to form the bonded session of UE 802, and reuse the IP address obtained for the WiFi connection as the IP address of the bonded session of UE 802.

It is noted that the SGW/WiFi-GW 830 may be configured to obtain the IP address for the bonded session of UE 802 in other ways.

The SGW/WiFi-GW 830 is configured to support use of the bonded session for UE 802. It will be appreciated that, in general, the bonded session supported for UE 802 (where the bonded session is terminated at a non-anchor GW node, illustratively, SGW/WiFi-GW 830) may operate in a manner similar to bonded session support as depicted and described with respect to FIG. 1-FIG. 7 (where the bonded sessions are terminated at an anchor GW node such as the PGW/SGW 150). For example, SGW/WiFi-GW 830 may be configured to operate a source/sink of traffic for the bonded session for UE 802, such as where SGW/WiFi-GW 830 may be configured to control distribution of downstream traffic (e.g., traffic received from PGW 840 and intended for delivery to UE 802) over the connections of the bonded session for delivery to the UE 802 and may be configured to aggregate upstream traffic of the connections of the bonded session (e.g., traffic received from UE 802 via eNodeB 810 and WAP 820) for delivery to PGW 840. The SGW/WiFi-GW 830 may be configured to provide various other functions in support of the bonded session for UE 802, at least some of which may be performed in a manner identical or similar to that of functions performed by an anchor GW node for bonded sessions as depicted and described with respect to FIG. 1-FIG. 7 (where the bonded sessions are terminated at an anchor GW node such as the PGW/SGW 150).

Figure 9:
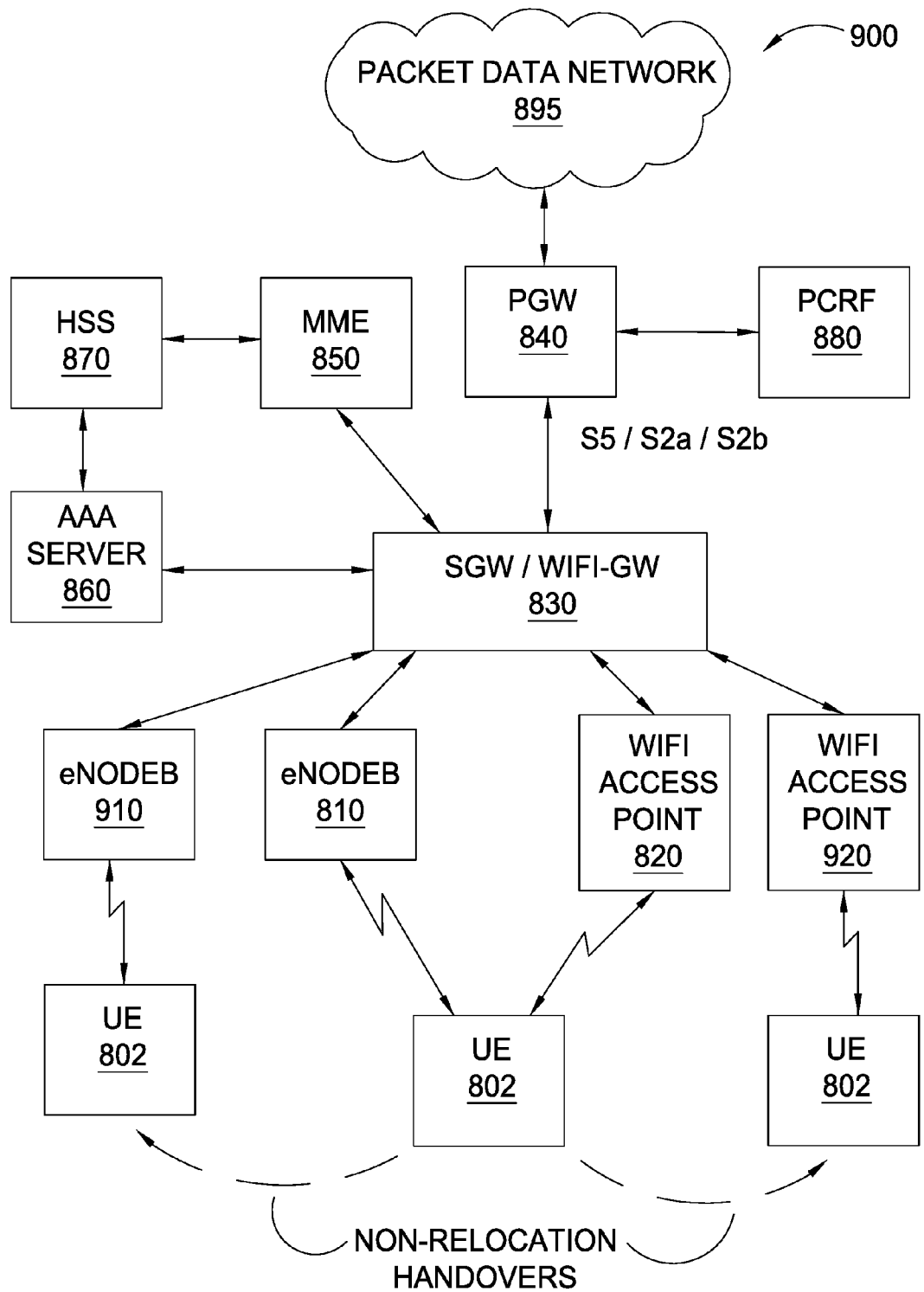
FIG. 9 depicts an exemplary wireless communication system including a non-anchor GW node configured to support a bonded session, and illustrates a non-relocation handover in which the UE moves between access points associated with a common non-anchor GW node.
Figure 10:
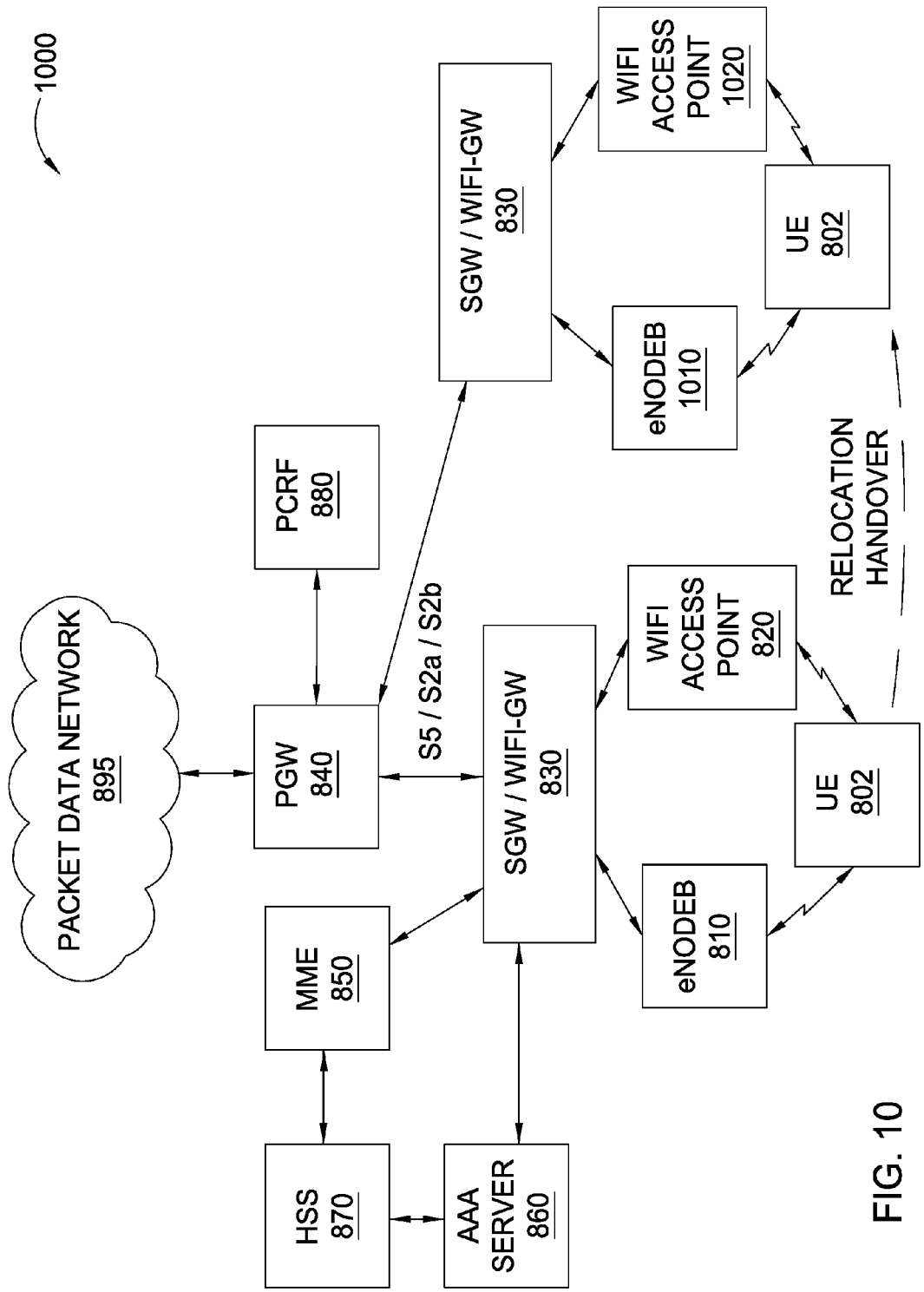
FIG. 10 depicts an exemplary wireless communication system including a non-anchor GW node configured to support a bonded session, and illustrates a relocation handover in which the UE moves between access points associated with different non-anchor GW nodes.

The SGW/WiFi-GW 830 may be configured to provide various other functions in support of the bonded session for UE 802, such as one or more of supporting non-relocation handovers where UE 802 moves between access points served by the same SGW/WiFi-GW node (embodiments of which are depicted and described with respect to FIG. 9), supporting relocation handovers where UE 802 moves between access points served by different SGW/WiFi-GW nodes (embodiments of which are depicted and described with respect to FIG. 10), or the like, as well as various combinations thereof.

FIG. 9 depicts an exemplary wireless communication system including a non-anchor GW node configured to support a bonded session, and illustrates a non-relocation handover in which the UE moves between access points associated with a common non-anchor GW node.

The wireless communication system 900 of FIG. 9 is similar to the wireless communication system 800 of FIG. 8, with the exception that it depicts an additional eNodeB 910 and an additional WAP 920. The eNodeB 910 and WAP 920 each are communicatively connected to the SGW/WiFi-GW 830.

The wireless communication system 900 of FIG. 9 illustrates a non-relocation handover in which the UE moves between access points associated with a common non-anchor GW node. For example, as depicted in FIG. 9, UE 802 may move from being associated with eNodeB 810 to being associated with eNodeB 910, in which case the cellular connection of the bonded session for UE 802 changes. Similarly, for example, as depicted in FIG. 9, UE 802 may move from being associated with WAP 820 to being associated with WAP 920, in which case the WiFi connection of the bonded session for UE 802 changes.

The SGW/WiFi-GW 830 is configured to support continuity of the bonded session of the UE 802 during a non-relocation handover. The SGW/WiFi-GW 830 may be configured to handle non-relocation handovers for the cellular connection of the bonded session and for the WiFi connection of the bonded session independently. For example, the SGW/WiFi-GW 830 may be configured to handle a non-relocation handover for the cellular connection of the bonded session using inter-eNodeB handover procedures typically supported by the SGW node/function for inter-eNodeB handovers where the two eNodeBs are associated with the same SGW node/function. Similarly, for example, the SGW/WiFi-GW 830 may be configured to handle a non-relocation handover for the WiFi connection of the bonded session using inter-WAP handover procedures typically supported by the WiFi-GW function (e.g., TWAG or ePDG) for inter-WAP handovers where the two WAPs are associated with the same SGW node/function (e.g., using a Mobile call flow). The SGW/WiFi-GW 830 may be configured to handle non-relocation handovers for the cellular connection of the bonded session and for the WiFi connection of the bonded session without changing the IP address assigned to the bonded session or by changing the IP address assigned to the bonded session (e.g., where the handover is associated with connection whose IP address was used as the common IP address for the bonded session).

FIG. 10 depicts an exemplary wireless communication system including a non-anchor GW node configured to support a bonded session, and illustrates a relocation handover in which the UE moves between access points associated with different non-anchor GW nodes.

The wireless communication system 1000 of FIG. 10 is similar to the wireless communication system 800 of FIG. 8, with the exception that it depicts an additional SGW/WiFi-GW 1030 supporting an additional eNodeB 1010 and an additional WAP 1020. The eNodeB 1010 and WAP 1020 each are communicatively connected to the SGW/WiFi-GW 1030. The SGW/WiFi-GW 1030 is communicatively connected to the PGW 840.

The wireless communication system 1000 of FIG. 10 illustrates a relocation handover in which the UE moves between access points associated with different non-anchor GW nodes. For example, as depicted in FIG. 10, UE 802 may move from being associated with eNodeB 810 associated with SGW/WiFi-GW 830 to being associated with eNodeB 1010 associated with SGW/WiFi-GW 1030, in which case the cellular connection of the bonded session for UE 802 changes. Similarly, for example, as depicted in FIG. 10, UE 802 may move from being associated with WAP 820 associated with SGW/WiFi-GW 830 to being associated with WAP 1020 SGW/WiFi-GW 1030, in which case the WiFi connection of the bonded session for UE 802 changes.

The SGW/WiFi-GW 830 and SGW/WiFi-GW 1030 are configured to support transfer of the bonded session of the UE 802 during a relocation handover.

The SGW/WiFi-GW 830 and SGW/WiFi-GW 1030 may be configured to handle a relocation handover for the cellular connection of the bonded session using inter-SGW handover procedures typically supported by the SGW node/function for inter-SGW handovers. For example, the SGW/WiFi-GW 830 may send a modify bearer (MB) Request to PGW 840 in order to trigger migration of the cellular connection from SGW/WiFi-GW 830 to SGW/WiFi-GW 1030. This may trigger establishment a new cellular connection for UE 802 via SGW/WiFi-GW 1030 and termination of the existing cellular connection for UE 802 via SGW/WiFi-GW 830. The termination of the existing cellular connection for UE 802 via SGW/WiFi-GW 830 also may trigger termination of the existing WiFi connection for UE 802 via SGW/WiFi-GW 830 and establishment of a new WiFi connection for UE 802 for UE 802 via SGW/WiFi-GW 1030. The SGW/WiFi-GW 1030 associates the new cellular connection and the new WiFi connection to reconstitute the bonded session for UE 802.

In at least some embodiments, the Protocol Configuration Options (PCO) may be extended to include information about the SGW/WiFi-GW 1030 to which UE 802 is relocating. This may be used by the WiFi connection to connect to the SGW/WiFi-GW 1030 to which UE 802 is relocating without issuing a DNS query, which addresses the potential issue of having to match the DNS query result for the relocation of the WiFi connection with the MME selection for the relocation of the cellular connection (i.e., where both the DNS query and the MME selection are performed, there is a possibility that the DNS query and the MME selection could identify different SGW/WiFi-GW nodes (rather than both identifying SGW/WiFi-GW 1030)).

In at least some embodiments, the SWm interface (omitted for purposes of clarity) between the WiFi-GW elements and the AAA server 860 may be extended to include SGW/WiFi-GW address information which may be used to update the HSS 870 regarding the change from the existing gateway (SGW/WiFi-GW 830) to the new gateway (SGW/WiFi-GW 1030). The HSS 870, based on the indication of the change of the UE 802 from the existing gateway (SGW/WiFi-GW 830) to the new gateway (SGW/WiFi-GW 1030), removes the LTE connection and ePDG connection; however, as part of SWm interaction, the HSS 870 obtains the address of the new gateway (SGW/WiFi-GW 1030) and communicates the address of the new gateway (SGW/WiFi-GW 1030) in a manner for triggering the UE 802 to communicate to the new gateway (SGW/WiFi-GW 1030). In at least some embodiments, communication of the address of the new gateway (SGW/WiFi-GW 1030) in a manner for triggering the UE 802 to communicate to the new gateway (SGW/WiFi-GW 1030) may be performed using an Internet Key Exchange (IKE) redirect using the existing address of the existing gateway (SGW/WiFi-GW 830) as a redirect address which thereby triggers UE 802 to communicate to the new gateway (SGW/WiFi-GW 1030). In at least some embodiments, for example, a special IKE error code for gateway relocation can be added as part of messaging in order to indicate the reason for the redirect.

Figure 11:
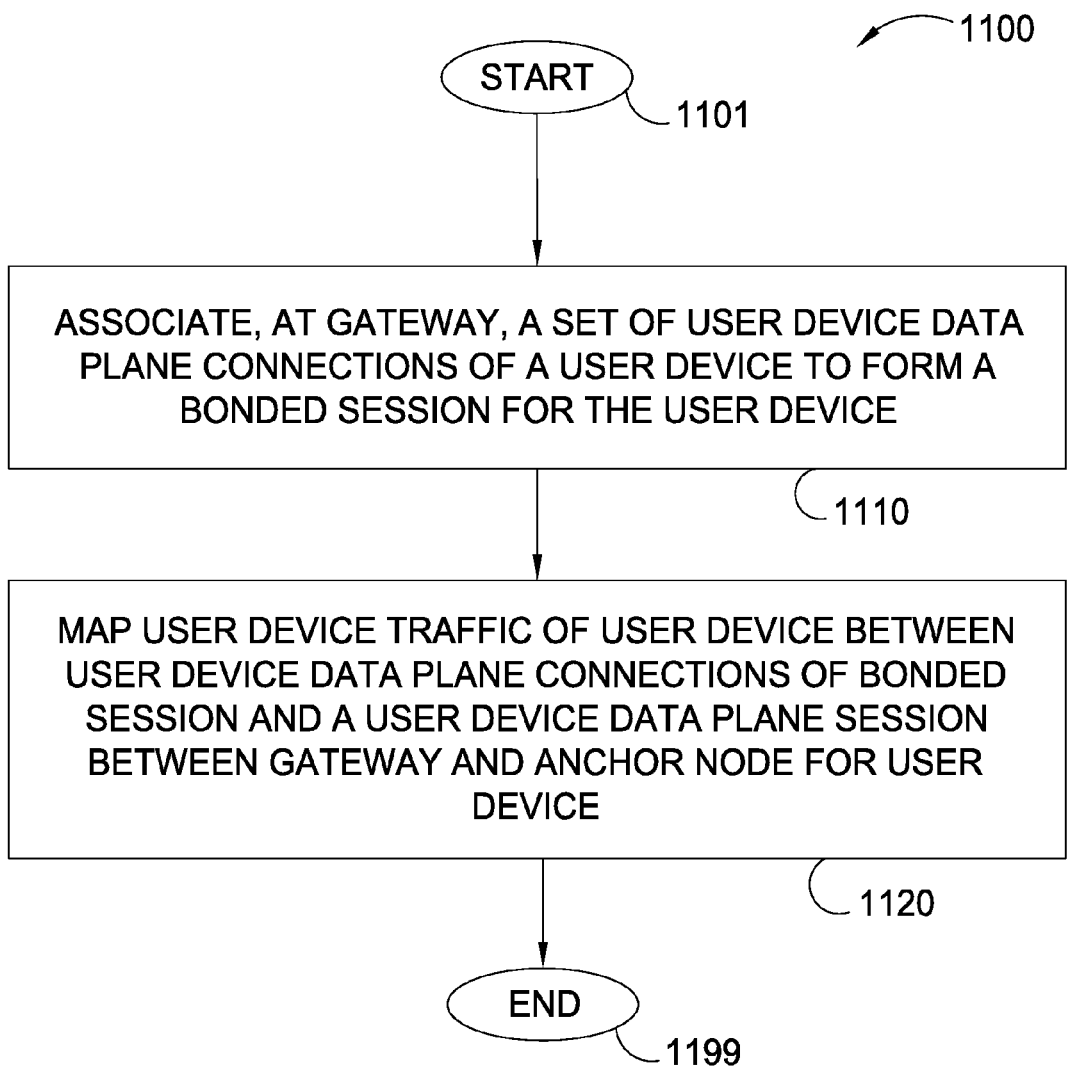
FIG. 11 depicts an exemplary embodiment of a method for supporting a bonded session on a non-anchor gateway node.

FIG. 11 depicts an exemplary embodiment of a method for supporting a bonded session on a non-anchor gateway node. It will be appreciated that although primarily presented herein as being performed serially, at least a portion of the steps of method 1100 may be performed contemporaneously or in a different order than as presented in FIG. 11. At step 1101, method 1100 begins. At step 1110, the non-anchor gateway node associates a set of user device data plane connections of a user device to form a bonded session for the user device. The bonded session for the user device has a single address (e.g., IP address) assigned thereto. The single address assigned to the bonded session may be obtained by the non-anchor gateway node based on interaction with an anchor node for the user device. At step 1120, user device traffic of the user device is mapped between the user device data plane connections of the bonded session and a user device data plane session between the non-anchor gateway node and the anchor node for the user device. At step 1199, method 1100 ends.

It will be appreciated that, although primarily depicted and described with respect to embodiments in which the non-anchor gateway node for the bonded session of the user device is disposed between the user device and the anchor node for the user device for both of the connections of the bonded session of the user device, in at least some embodiments, the anchor node for the user device may be disposed between the user device and the non-anchor gateway node for the bonded session of the user device along the path of at least one of the connections of the bonded session of the user device. An exemplary embodiment of a wireless communication system including a non-anchor gateway node configured to support a bonded session for a user device and including an anchor node for the user device, where the anchor node for the user device is disposed between the user device and the non-anchor gateway node for the bonded session of the user device along the path of the cellular connection of the bonded session of the user device, is depicted and described with respect to FIG. 12.

Figure 12:
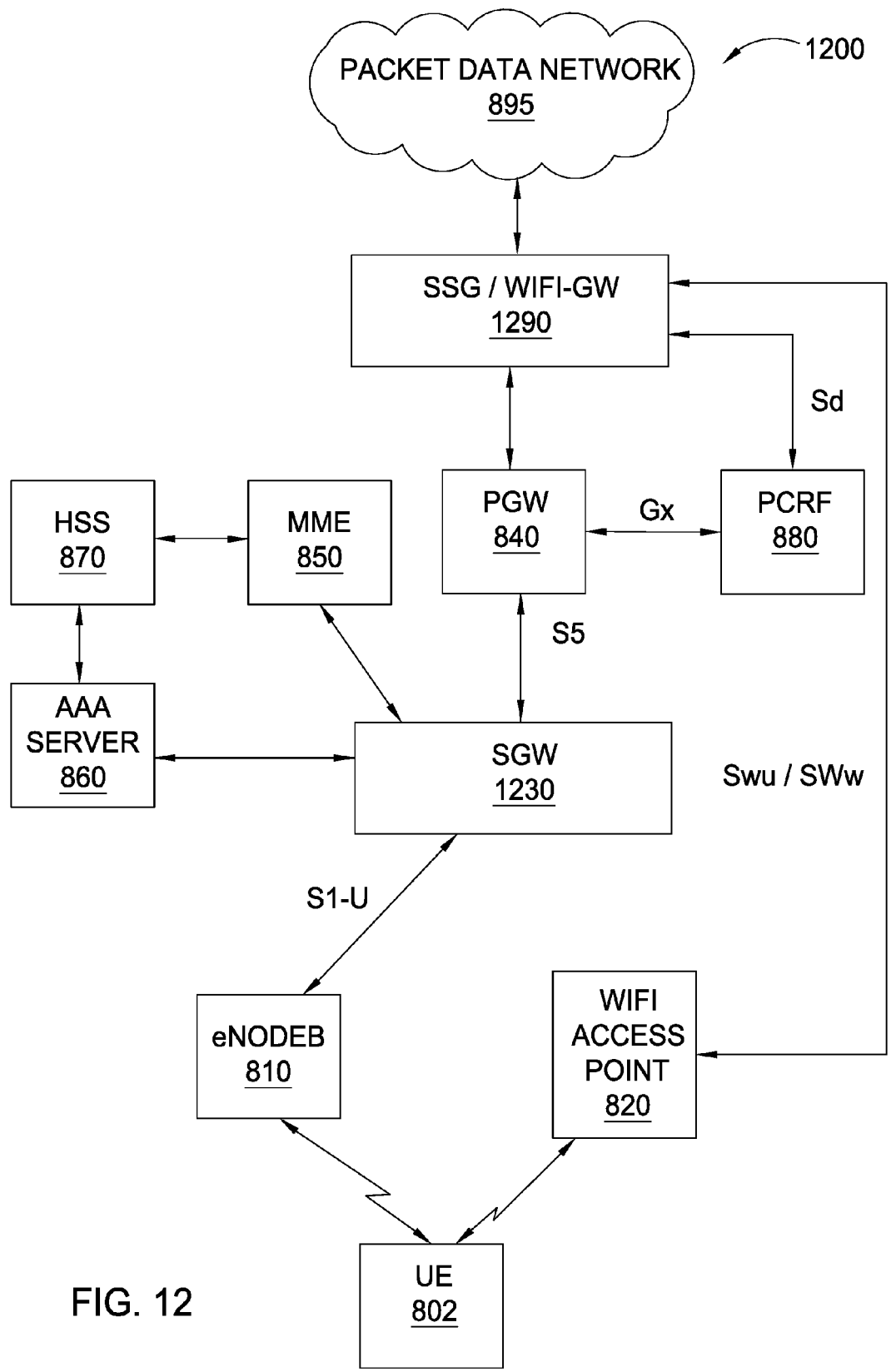
FIG. 12 depicts an exemplary wireless communication system including a non-anchor gateway node configured to support a bonded session.

FIG. 12 depicts an exemplary wireless communication system including a non-anchor gateway node configured to support a bonded session.

The wireless communication system 1200 includes a UE 802, an eNodeB 810, a WIFI access point (WAP) 820, an SGW 1230, a PGW 840, an MME 850, an AAA server 860, an HSS 870, a PCRF 880, a Service Steering Gateway (SSG)/WiFi-GW 1290, and a packet data network (PDN) 895. The UE 802 is a dual-mode wireless device that is configured to support cellular-based wireless communications via eNodeB 820 and WiFi-based wireless communications via WAP 820. The eNodeB 810 is a cellular access point and is communicatively connected to SGW 1230 (e.g., via an S1-U interface). The WAP 820 is a WiFi access point and is communicatively connected to SSG/WiFi-GW 1290 (bypassing SGW 1230 and PGW 840, unlike the arrangement of wireless communication system 800 of FIG. 8). The WAP 820 may be configured to support trusted WiFi communications, in which case the WiFi-GW functions of SSG/WiFi-GW 1290 may include Trusted Wireless Access Gateway (TWAG) functionality for trusted WiFi access. The WAP 820 may be configured to support untrusted WiFi communications, in which case the WiFi-GW functions of SSG/WiFi-GW 1290 may include Enhanced Packet Data Gateway (ePDG) functionality for untrusted WiFi access. The SGW 1230, unlike the SGW/WiFi-GW 830 of FIG. 8, does not provide the bonded session for UE 802 (rather, as discussed further below, the bonded session for UE 802 is provided by SSG/WiFi-GW 1290). The SGW 1230 is communicatively connected to PGW 840. The PGW 840 is configured to operate as a gateway for traffic between SGW 1230 and SSG/WiFi-GW 1290. The SSG/WiFi-GW 1290 is configured to provide a bonded session for UE 802. The SSG/WiFi-GW 1290 is configured to operate a gateway to PDN 895. The SGW 1230 also is communicatively connected to MME 850 and AAA server 860. The PGW 840 is communicatively connected to PCRF 880 (e.g., via a Gx interface). The SSG/WiFi-GW 1290 also is communicatively connected to PCRF 880 (e.g., via an Sd interface). The PDN 895 may be any suitable type of packet data network accessible via SSG/WiFi-GW 1290, such as a public data network (e.g., the Internet), a private data network, or the like). It will be appreciated that various other types of communications between elements of wireless communication system 1200 may be supported.

The SSG/WiFi-GW 1290 is not an anchor node for UE 802 (and, thus, may be referred to more generally as a non-anchor GW node); rather, PGW 840 is configured to operate as the anchor node for UE 802 (and, thus, may be referred to more generally as an anchor node).

The SSG/WiFi-GW 1290 is a combined cellular/WiFi gateway device that is configured to support a bonded session for UE 802. The bonded session may be a bonding of a cellular connection (via eNodeB 810, SGW 1230, and PGW 840) and a trusted WiFi connection (via WAP 820, where WAP 820 is a trusted WAP), a bonding of a cellular connection (via eNodeB 810, SGW 1230, and PGW 840) and an untrusted WiFi connection (via WAP 820, where WAP 820 is an untrusted WAP), or the like.

The SSG/WiFi-GW 1290 is configured to support establishment of the bonded session for UE 802. As discussed herein, a bonded session uses a single IP address for the connections that are bonded to form the bonded session. The SSG/WiFi-GW 1290, however, since it is not an anchor node for UE 802, is not configured to assign IP addresses to connections of the UE 802 (including connections which are bonded to form the bonded session); rather, the PGW 840 provides this IP address assignment function since it is operating as the anchor for UE 802. The SSG/WiFi-GW 1290, since it does not assign the IP addresses to the connections which are associated to form the bonded session of UE 802, obtains an IP address to be used as the IP address for the bonded session of UE 802. The SSG/WiFi-GW 1290 may obtain the IP address for the bonded session of UE 802 from the anchor node for UE 802 (e.g., by requesting the IP address from the PGW 840, which is operating as the anchor node for UE 802). The SSG/WiFi-GW 1290 may obtain the IP address for the bonded session of UE 802 in various ways, such as by using an IP address learned from establishment of the connections which are bonded at the SSG/WiFi-GW 1290 to form the bonded session for UE 802 (e.g., reusing the IP address learned over the cellular/S5 connection where the cellular/S5 connection is setup first, reusing the IP address learned over the WiFi/Swu/SWw connection where the WiFi/Swu/SWw connection is setup first, reusing whichever IP address was learned first or most recently, or the like), selecting one of the IP addresses learned from establishment of the connections which are bonded at the SSG/WiFi-GW 1290 to form the bonded session for UE 802 (e.g., selecting between the IP address learned for cellular connection and the IP address learned for the WiFi connection, which may be selected based on whichever IP address was learned first, whichever IP address was learned most recently, or the like), or the like, as well as various combinations thereof.

The SSG/WiFi-GW 1290, where the cellular connection for the UE 802 is established first (which may include obtaining an IP address for the cellular connection from the anchor node for the UE 802 (e.g., PGW 840) via the Sd interface), upon receiving an indication of a request for a WiFi connection for the UE 802, may send a request to the PGW 840 to also obtain an IP address for the WiFi connection of the UE 802 (e.g., by sending a CS request to the anchor node for the UE 802) and may then select one of the two IP addresses assigned for the UE 802 (e.g., for the cellular connection or the WiFi connection) as the IP address to be used for the bonded session of UE 802.

The SSG/WiFi-GW 1290, where the cellular connection for the UE 802 is established first (which may include obtaining an IP address for the cellular connection from the anchor node for the UE 802 (e.g., PGW 840) via the Sd interface), upon receiving an indication of a request for a WiFi connection for the UE 802, may suppress or prevent the sending of a request to the PGW 840 to also obtain an IP address for the WiFi connection of the UE 802, may terminate the WiFi connection of the UE 802 at SSG/WiFi-GW 1290 (again, without sending a CS request to the anchor node for the UE 802 for the WiFi connection), bond the WiFi connection with the cellular connection at the SSG/WiFi-GW 1290 to form the bonded session of UE 802, and reuse the IP address obtained for the cellular connection as the IP address of the bonded session of UE 802.

The SSG/WiFi-GW 1290, where the WiFi connection for the UE 802 is established first (which may include obtaining an IP address for the WiFi connection from the anchor node for the UE 802 (e.g., PGW 840)), upon receiving an indication of a request for a cellular connection for the UE 802, may send a request to the PGW 840 to also obtain an IP address for the cellular connection of the UE 802 (e.g., by sending a CS request to the anchor node for the UE 802 via Sd for the cellular connection) and may then select one of the two IP addresses assigned for the UE 802 (e.g., for the WiFi connection or the cellular connection) as the IP address to be used for the bonded session of UE 802.

The SSG/WiFi-GW 1290, where the WiFi connection for the UE 802 is established first (which may include obtaining an IP address for the WiFi connection from the anchor node for the UE 802 (e.g., PGW 840)), upon receiving an indication of a request for a cellular connection for the UE 802, may suppress or prevent the sending of a request to the PGW 840 to also obtain an IP address for the cellular connection of the UE 802, may terminate the cellular connection of the UE 802 at SSG/WiFi-GW 1290 (again, without sending a CS request to the anchor node for the UE 802 for the cellular connection), bond the cellular connection with the WiFi connection at the SSG/WiFi-GW 1290 to form the bonded session of UE 802, and reuse the IP address obtained for the WiFi connection as the IP address of the bonded session of UE 802.

It is noted that the SSG/WiFi-GW 1290 may be configured to obtain the IP address for the bonded session of UE 802 in other ways.

The SSG/WiFi-GW 1290 is configured to support use of the bonded session for UE 802. It will be appreciated that, in general, the bonded session supported for UE 802 (where the bonded session is terminated at a non-anchor GW node, illustratively, SSG/WiFi-GW 1290) may operate in a manner similar to bonded session support as depicted and described with respect to FIG. 1-FIG. 7 (where the bonded sessions are terminated at an anchor GW node such as the PGW/SGW 150).

Various embodiments of supporting bonded sessions on non-anchor gateway nodes, versus anchor nodes, may provide various potential benefits. For example, various embodiments of supporting bonded sessions on non-anchor gateway nodes may enable operators to take advantage of bonding (and, thus, improve application and network performance) without having to modify the anchor node (which typically will have various customer features that make it difficult to introduce bonding on the anchor node). For example, various embodiments of supporting bonded sessions on non-anchor gateway nodes may provide better scalability of bonding. Various embodiments of supporting bonded sessions on non-anchor gateway nodes, versus anchor nodes, may provide various other potential benefits.

Figure 13:
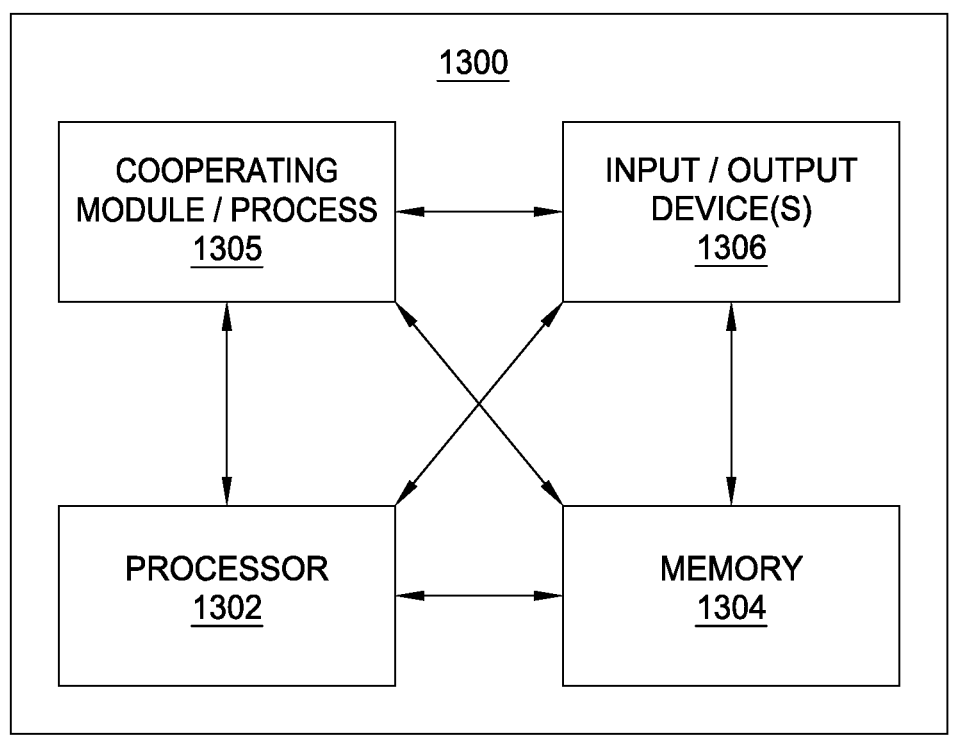
FIG. 13 depicts a high-level block diagram of a computer suitable for use in performing functions presented herein.

FIG. 13 depicts a high-level block diagram of a computing device, such as a processor in a telecom network element, suitable for use in performing functions described herein such as those associated with the various elements described herein with respect to the figures.

As depicted in FIG. 13, computing device 1300 includes a processor element 1302 (e.g., a central processing unit (CPU) and/or other suitable processor(s)), a memory 1304 (e.g., random access memory (RAM), read only memory (ROM), and the like), a cooperating module/process 1305, and various input/output devices 1306 (e.g., a user input device (such as a keyboard, a keypad, a mouse, and the like), a user output device (such as a display, a speaker, and the like), an input port, an output port, a receiver, a transmitter, and storage devices (e.g., a persistent solid state drive, a hard disk drive, a compact disk drive, and the like)).

In the case of a routing or switching device such as PGW/SGW 150, RG/CPE 110, BNG 130, and the like, the cooperating module process 1305 may implement various switching devices, routing devices, interface devices, and so on, as known to those skilled in the art. Thus, if the computing device 1300 is implemented within the context of such a routing or switching device (or within the context of one or more modules or sub-elements of such a device), further functions appropriate to that routing or switching device also are contemplated and these further functions may be in communication with or otherwise associated with the processor 1302, input/output devices 1306, and memory 1304 of the computing device 1300 described herein.

It will be appreciated that the functions depicted and described herein may be implemented in hardware and/or in a combination of software and hardware, e.g., using a general purpose computer, one or more application specific integrated circuits (ASIC), and/or any other hardware equivalents. In one embodiment, the cooperating process 1305 can be loaded into memory 1304 and executed by processor 1302 to implement the functions as discussed herein. Thus, cooperating process 1305 (including associated data structures) can be stored on a computer readable storage medium, e.g., RAM memory, magnetic or optical drive or diskette, and the like.

It will be appreciated that computing device 1300 depicted in FIG. 13 provides a general architecture and functionality suitable for implementing functional elements described herein or portions of the functional elements described herein.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computing device, adapt the operation of the computing device such that the methods and/or techniques described herein are invoked or otherwise provided. Instructions for invoking various methods presented herein may be stored in tangible and non-transitory computer readable medium such as fixed or removable media or memory, and/or stored within a memory within a computing device operating according to the instructions.

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory including computer program code;
   wherein the at least one memory and the computer program code are configured to, with the at least one processor, cause the apparatus to at least:
   associate, at a gateway device, a set of user device data plane connections of an intended user device to form a bonded session for the intended user device, the set of user device data plane connections including a first user device data plane connection associated with a first access network and a second user device data plane connection associated with a second access network; and
   map, at the gateway device, user device traffic of the intended user device between the user device data plane connections of the bonded session and a user device data plane session between the gateway device and an anchor node for the intended user device.

2. The apparatus of claim 1, wherein the at least one memory and the computer program code are configured to, with the at least one processor, cause the apparatus to at least:
   obtain an address for the bonded session for the intended user device; and
   associate the address with the bonded session for the intended user device.

3. The apparatus of claim 2, wherein, to obtain the address for the bonded session, the at least one memory and the computer program code are configured to, with the at least one processor, cause the apparatus to at least:
   select the address from a respective set of addresses assigned by the anchor node for the respective user device data plane connections.

4. The apparatus of claim 2, wherein the address comprises an Internet Protocol (IP) address.

5. The apparatus of claim 1, wherein the user device traffic comprises downstream traffic intended for delivery to the intended user device, wherein, to map the user device traffic between the user device data plane connections of the bonded session and the user device data plane session, the at least one memory and the computer program code are configured to, with the at least one processor, cause the apparatus to at least:
   determine an allocation of the user device traffic to the user device data plane connections of the bonded session; and
   provide the user device traffic to the user device data plane connections of the bonded session based on the allocation of the user device traffic to the user device data plane connections of the bonded session.

6. The apparatus of claim 5, wherein the allocation of the user device traffic to the user device data plane connections of the bonded session is determined based on at least one of policy information associated with the intended user device or traffic monitoring information determined based on monitoring of the user device traffic.

7. The apparatus of claim 5, wherein the allocation of the user device traffic to the user device data plane connections of the bonded session is indicative of respective portions of the user device traffic to be transported by the respective user device data plane connections of the bonded session.

8. The apparatus of claim 1, wherein the user device traffic comprises upstream traffic provided by the intended user device via the bonded session, wherein, to map the user device traffic between the user device data plane connections of the bonded session and the user device data plane session, the at least one memory and the computer program code are configured to, with the at least one processor, cause the apparatus to at least:
   provide the user device traffic received via the user device data plane connections of the bonded session to the user device data plane session between the gateway device and the anchor node for the intended user device.

9. The apparatus of claim 1, wherein the user device traffic comprises upstream traffic provided by the intended user device via the bonded session, wherein, to map the user device traffic between the user device data plane connections of the bonded session and the user device data plane session, the at least one memory and the computer program code are configured to, with the at least one processor, cause the apparatus to at least:
   combine respective portions of the user device traffic received via the user device data plane connections of the bonded session to form combined user device traffic; and
   provide the combined user device traffic to the user device data plane session between the gateway device and the anchor node for the intended user device.

10. The apparatus of claim 1, wherein the first user device data plane connection comprises a wireless connection and the first access network comprises a wireless access network, wherein the at least one memory and the computer program code are configured to, with the at least one processor, cause the apparatus to at least:
    support a non-relocation handover of the intended user device using a handover procedure configured for handover between wireless access points.

11. The apparatus of claim 1, wherein the intended user device comprises a customer premises equipment (CPE) device or a wireless user device.

12. The apparatus of claim 1, wherein the first access network is a wireline access network and the second access network is a wireless access network.

13. The apparatus of claim 12, wherein the wireline network comprises a cable network or a digital subscriber line (DSL) network, wherein the wireless network comprises a cellular network or a wireless local area network (WLAN).

14. The apparatus of claim 1, wherein the first access network is a first type of wireless access network and the second access network is a second type of wireless access network.

15. The apparatus of claim 14, wherein the first type of wireless access network is a cellular network and the second type of wireless access network is a WiFi network.

16. An apparatus, comprising:
    at least one processor; and
    at least one memory including computer program code;
    wherein the at least one memory and the computer program code are configured to, with the at least one processor, cause the apparatus to at least:
    associate, at a gateway device associated with an anchor node for a user device to form a bonded session for the user device, a set of user device data plane connections including first and second user device data plane connections associated with respective first and second access networks, wherein the bonded session for the user device has associated therewith for use by the first user device data plane connection and the second user device data plane connection an address assigned by the anchor node for use by the first user device data plane connection;

map user device traffic of the user device between the user device data plane connections of the bonded session and a user device data plane session between the gateway device and the anchor node;

detect a non-relocation handover of the user device; and determine, based on a determination as to whether the non-relocation handover of the user device is associated with the first user device data plane connection or the second user device data plane connection, whether to obtain a new address for the bonded session.

17. The apparatus of claim 16, wherein the at least one memory and the computer program code are configured to, with the at least one processor, cause the apparatus to at least:

based on a determination that the non-relocation handover is associated with the first user device data plane connection, propagate from the gateway device toward the anchor node a request for a new address for the first user device data plane connection; and associate the new address with the bonded session for use by the first user device data plane connection and the second user device data plane connection.

18. An apparatus, comprising:
at least one processor; and
at least one memory including computer program code;
wherein the at least one memory and the computer program code are configured to, with the at least one processor, cause the apparatus to at least:
associate, at a gateway device associated with an anchor node for a user device to form a bonded session for the user device, a set of user device data plane connections of the user device including first and second user device data plane connections associated with respective first and second access networks, wherein the first user device data plane connection comprises a wireless connection and the first access network comprises a wireless access network;
map user device traffic of the user device between the user device data plane connections of the bonded session and a user device data plane session between the gateway device and the anchor node;
detect a relocation handover of the user device that is associated with the first user device data plane connection; and
propagate, from the gateway device toward the anchor node, a message configured to trigger a handover of the first user device data plane connection from the gateway device to a second gateway device associated with the anchor node.

19. A non-transitory computer-readable storage medium comprising program instructions for causing an apparatus to perform at least:
associating, at a gateway device, a set of user device data plane connections of an intended user device to form a bonded session for the intended user device, the set of user device data plane connections including a first user device data plane connection associated with a first access network and a second user device data plane connection associated with a second access network; and
mapping, at the gateway device, user device traffic of the intended user device between the user device data plane connections of the bonded session and a user device data plane session between the gateway device and an anchor node for the intended user device.

20. A method, comprising:
associating, at a gateway device comprising a processor and a memory, a set of user device data plane connections of an intended user device to form a bonded session for the intended user device, the set of user device data plane connections including a first user device data plane connection associated with a first access network and a second user device data plane connection associated with a second access network; and
mapping, at the gateway device, user device traffic of the intended user device between the user device data plane connections of the bonded session and a user device data plane session between the gateway device and an anchor node for the intended user device.

21. An apparatus, comprising:
at least one processor; and
at least one memory including computer program code;
wherein the at least one memory and the computer program code are configured to, with the at least one processor, cause the apparatus to at least:
associate, at a gateway device, a set of user device data plane connections of an intended user device to form a bonded session for the intended user device, the set of user device data plane connections including a first user device data plane connection associated with a first access network and a second user device data plane connection associated with a second access network, the first user device data plane connection being supported by a data plane connection between the gateway device and an anchor node for the intended user device;
receive, at the gateway device, user device traffic intended for the intended user device; and
allocate, at the gateway device, the user device traffic to the user device data plane connections of the bonded session for the intended user device.

* * * * *